(12) United States Patent
Yan et al.

(10) Patent No.: US 12,058,561 B2
(45) Date of Patent: *Aug. 6, 2024

(54) COMMUNICATION METHOD, DEVICE, AND SYSTEM

(71) Applicant: HUAWEI TECHNOLOGIES CO., LTD., Guangdong (CN)

(72) Inventors: Chunxiang Yan, Shenzhen (CN); Youyang Yu, Shanghai (CN); Wenfu Wu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,368

(22) Filed: Jun. 23, 2023

(65) Prior Publication Data

US 2023/0337049 A1 Oct. 19, 2023

Related U.S. Application Data

(63) Continuation of application No. 16/828,680, filed on Mar. 24, 2020, now Pat. No. 11,689,958, which is a
(Continued)

(51) Int. Cl.
*H04W 28/02* (2009.01)
*H04L 45/00* (2022.01)
(Continued)

(52) U.S. Cl.
CPC ......... *H04W 28/0268* (2013.01); *H04L 45/38* (2013.01); *H04L 45/74* (2013.01); *H04W 28/10* (2013.01)

(58) Field of Classification Search
CPC .. H04W 28/0268; H04W 28/10; H04L 45/38; H04L 45/74
See application file for complete search history.

(56) References Cited

U.S. PATENT DOCUMENTS 9,781,652 B2 10/2017 Hsu et al.
11,689,958 B2 * 6/2023 Yan ................... H04W 28/0268
370/235
(Continued)

FOREIGN PATENT DOCUMENTS

CN 103888380 A 6/2014
CN 105933232 A 9/2016
(Continued)

*Primary Examiner* — Siming Liu
(74) *Attorney, Agent, or Firm* — WOMBLE BOND DICKINSON (US) LLP

(57) ABSTRACT

Embodiments of this application provide a communication method, a device, and a system, to resolve an out-of-order problem caused by per-packet traffic splitting. The method includes: determining, by a sending device, a sequence identifier of a to-be-transmitted data packet and an identifier of a first link for transmitting the data packet; and sending, by the sending device, the data packet to a receiving device, where a header of the data packet includes the identifier of the first link and the sequence identifier, the identifier of the first link is used to identify the first link, and the sequence identifier is used to identify a sending order of the data packet over the first link or in a link group to which the first link belongs.

21 Claims, 17 Drawing Sheets

Related U.S. Application Data continuation of application No. PCT/CN2017/108752, filed on Oct. 31, 2017.

(51) Int. Cl.
  *H04L 45/74* (2022.01)
  *H04W 28/10* (2009.01)

(56) References Cited

U.S. PATENT DOCUMENTS

| | | |
|---|---|---|
| 2015/0264726 A1 | 9/2015 | Zhu et al. |
| 2017/0055313 A1 | 2/2017 | Sharma et al. |
| 2017/0245184 A1 | 8/2017 | Nagesh Shetigar et al. |
| 2019/0150219 A1 | 5/2019 | Wang et al. |

FOREIGN PATENT DOCUMENTS

| | | |
|---|---|---|
| CN | 106454414 A | 2/2017 |
| WO | 2016156425 A1 | 10/2016 |

* cited by examiner

COMMUNICATION METHOD, DEVICE, AND SYSTEM

CROSS-REFERENCE TO RELATED APPLICATIONS

This application is a continuation of U.S. patent application Ser. No. 16/828,680, filed on Mar. 24, 2020, now U.S. Pat. No. 11,689,958, which is a continuation of International Application No. PCT/CN2017/108752, Oct. 31, 2017. All of the afore-mentioned patent applications are hereby incorporated by reference in their entireties.

TECHNICAL FIELD

This application relates to the field of communications technologies, and in particular, to a communication method, a device, and a system.

BACKGROUND

To address challenges from wireless broadband technologies and keep 3rd generation partnership project (3GPP) networks at the leading edge, the 3GPP standardization group formulated a network architecture of a next generation mobile communications system (next generation system) at the end of 2016, which is referred to as a 5th generation (5G) network architecture. This architecture not only supports access to a 5G core network using a wireless technology defined by the 3GPP standardization group, but also supports access to the 5G core network using a non-3GPP (N3G) access technology. In other words, the 5G network architecture provides a possibility for a scenario of dual-access or even multi-access.

In a dual-access scenario, it is assumed that as shown in FIG. 1, a bandwidth on a 3GPP side is 50 megabits per second (Mbps), a bandwidth on an N3G side is 50 Mbps, an internet protocol (IP) flow (flow) A occupies 30 Mbps, and an IP flow B occupies 30 Mbps. In this case, there is an extra bandwidth of 20 Mbps available on either side. If an IP flow C requires a bandwidth of 30 Mbps, per-packet traffic splitting may be performed to improve bandwidth utilization. In other words, per-packet traffic splitting is performed for the IP flow C on the 3GPP side and the N3G side. With a bandwidth of 40 Mbps, an aggregation tunnel is enough to carry the IP flow C.

However, in an existing per-packet traffic splitting technology, IP data packets that are directly transmitted in a traffic splitting manner are very likely to arrive out of order at a receive end. Consequently, packet loss frequently occurs at a transmission control protocol (TCP) layer above an IP layer, reducing benefits brought by traffic splitting; in addition, when streaming media service data is transmitted at a user datagram protocol (UDP) layer above the IP layer, frame skipping and frame freezing may occur due to out-of-order, resulting in poor user experience.

Therefore, how to avoid an out-of-order problem caused by per-packet traffic splitting is an urgent problem that needs to be resolved currently.

SUMMARY

Embodiments of this application provide a communication method, a device, and a system, to resolve an out-of-order problem caused by per-packet traffic splitting.

To achieve the foregoing objective, the embodiments of this application provide the following technical solutions.

According to a first aspect, a communication method is provided, and the method includes: determining, by a sending device, a sequence identifier of a to-be-transmitted data packet and an identifier of a first link for transmitting the data packet; sending, by the sending device, the data packet to a receiving device, where a header of the data packet includes the identifier of the first link and the sequence identifier, the identifier of the first link is used to identify the first link, and the sequence identifier is used to identify a sending order of the data packet over the first link or in a link group to which the first link belongs. Based on the method, when sending the data packet, the sending device first determines the sequence identifier of the to-be-transmitted data packet and the identifier of the first link for transmitting the data packet, and adds the identifier of the first link and the sequence identifier to the header of the data packet, so that after receiving the data packet from the sending device, the receiving device can order, based on the identifier of the first link and the sequence identifier, out-of-order data packets in the receiving device that are from the first link or the link group to which the first link belongs. Therefore, an out-of-order problem caused by per-packet traffic splitting can be resolved. Further, packet loss at a TCP layer above an IP layer can be reduced, and frame skipping and frame freezing due to out-of-order do not occur when streaming media service data is transmitted at a UDP layer above the IP layer, so that user experience is improved.

In a possible embodiment, the sequence identifier is used to identify the sending order of the data packet over the first link, and the determining, by a sending device, an identifier of a first link for transmitting the data packet includes: determining, by the sending device based on a correspondence between the identifier of the first link and a service flow identifier, the identifier of the first link for transmitting the data packet, where the service flow identifier is used to identify a service flow to which the data packet belongs. In other words, the sending device may store the correspondence between the identifier of the first link and the service flow identifier. In this case, the sending device may determine, based on the correspondence, the identifier of the first link for transmitting the data packet.

In a possible embodiment, the service flow identifier includes a 5-tuple, a quality of service flow identifier (QFI), or a service flow identifier at a session granularity.

In a possible embodiment, the service flow identifier includes the 5-tuple, and the determining, by the sending device based on a correspondence between the identifier of the first link and a service flow identifier, the identifier of the first link for transmitting the data packet includes: determining, by the sending device based on a 5-tuple of the data packet and a correspondence between the identifier of the first link and the 5-tuple, the identifier of the first link for transmitting the data packet.

In a possible embodiment, the service flow identifier includes the QFI or the service flow identifier at the session granularity, and the determining, by the sending device based on a correspondence between the identifier of the first link and a service flow identifier, the identifier of the first link for transmitting the data packet includes: determining, by the sending device, the service flow identifier based on a 5-tuple of the data packet; and determining, by the sending device based on the service flow identifier and the correspondence between the identifier of the first link and the service flow identifier, the identifier of the first link for transmitting the data packet. In other words, when the data packet is transmitted, the 5-tuple of the data packet may be learned, then the QFI or the service flow identifier at the session granularity may be determined based on the 5-tuple of the data packet, and the identifier of the first link for transmitting the data packet may be determined based on the QFI or the service flow identifier at the session granularity, and the correspondence between the identifier of the first link and the service flow identifier.

In a possible embodiment, the method further includes: receiving, by the sending device from a session management entity, the correspondence between the identifier of the first link and the service flow identifier, where the identifier of the first link is allocated by the session management entity. In other words, the link in this embodiment of this application may use a single link identifier. To be specific, when uplink transmission and downlink transmission are performed over the link, identifiers of the link that are used may be the same.

In a possible embodiment, when the sending device is a user plane function entity, the identifier of the first link is allocated by a terminal; or when the sending device is a terminal, the identifier of the first link is allocated by a session management entity. In other words, the link in this embodiment of this application may use two link identifiers. To be specific, when uplink transmission and downlink transmission are performed over the link, identifiers of the link that are used may be different.

In a possible embodiment, the first link corresponds to a first access device and a second access device, the first access device is an access device corresponding to a first access technology, and the second access device is an access device corresponding to a second access technology.

In a possible embodiment, the method further includes: establishing, by the sending device, a correspondence between the identifier of the first link, information of the first access device, and information of the second access device. In other words, in this embodiment of this application, one link may correspond to two access devices, so that per-packet traffic splitting can be implemented by using a single link.

In a possible embodiment, the sequence identifier is used to identify the sending order of the data packet in the link group to which the first link belongs, and the determining, by a sending device, an identifier of a first link for transmitting the data packet includes: determining, by the sending device based on a correspondence between a service flow identifier and identifiers of a plurality of links in the link group, the identifier of the first link for transmitting the data packet, where the service flow identifier is used to identify a service flow to which the data packet belongs. In other words, the sending device may store the correspondence between the service flow identifier and the identifiers of the plurality of links in the link group. In this case, the sending device may determine, based on the correspondence, the identifier of the first link for transmitting the data packet.

In a possible embodiment, the service flow identifier includes a 5-tuple, a QFI, or a service flow identifier at a session granularity.

In a possible design, the service flow identifier includes the 5-tuple, and the determining, by the sending device based on a correspondence between a service flow identifier and identifiers of a plurality of links in the link group, the identifier of the first link for transmitting the data packet includes: determining, by the sending device based on a 5-tuple of the data packet and a correspondence between the 5-tuple and the identifiers of the plurality of links in the link group, the identifier of the first link for transmitting the data packet.

In a possible embodiment, the service flow identifier includes the QFI or the service flow identifier at the session granularity, and the determining, by the sending device based on a correspondence between a service flow identifier and identifiers of a plurality of links in the link group, the identifier of the first link for transmitting the data packet includes: determining, by the sending device, the service flow identifier based on a 5-tuple of the data packet; and determining, by the sending device based on the service flow identifier and the correspondence between the service flow identifier and the identifiers of the plurality of links in the link group, the identifier of the first link for transmitting the data packet. In other words, when the data packet is transmitted, the 5-tuple of the data packet may be learned, then the QFI or the service flow identifier at the session granularity may be determined based on the 5-tuple of the data packet, and the identifier of the first link for transmitting the data packet may be determined based on the QFI or the service flow identifier at the session granularity, and the correspondence between the service flow identifier and the identifiers of the plurality of links in the link group.

In a possible embodiment, the sending device is a terminal, the link group includes the first link and a second link, and the method further includes: sending, by the sending device, the identifier of the first link to a session management entity during establishment of the second link, where the first link is an established link; receiving, by the sending device from the session management entity, a correspondence between the identifier of the first link and an identifier of the second link, where the identifier of the first link is allocated by the session management entity; and establishing, by the sending device, a correspondence between the service flow identifier, the identifier of the first link, and the identifier of the second link. In other words, in this embodiment of this application, a link group may be constructed, so that per-packet traffic splitting can be implemented by using the link group.

In a possible embodiment, the sending device is a user plane function entity, the link group includes the first link and a second link, and the method further includes: receiving, by the sending device from a session management entity, a correspondence between the identifier of the first link and an identifier of the second link during establishment of the second link, where the identifier of the first link is allocated by the terminal or the identifier of the first link is allocated by the session management entity, and the first link is an established link; and establishing, by the sending device, a correspondence between the service flow identifier, the identifier of the first link, and the identifier of the second link. In other words, in this embodiment of this application, a link group may be constructed, so that per-packet traffic splitting can be implemented by using the link group.

In a possible embodiment, the first link corresponds to a first access device and a second access device, the first access device is an access device corresponding to a first access technology, and the second access device is an access device corresponding to a second access technology. In other words, in this embodiment of this application, each link in a link group corresponds to one access device.

In a possible embodiment, the method further includes: establishing, by the sending device, a correspondence between the identifier of the first link and information of the first access device, and a correspondence between the identifier of the second link and information of the second access device.

In a possible design, links in the link group share one sending sequence. In other words, in this embodiment of this application, per-packet traffic splitting can be implemented by using a link group.

According to a second aspect, a communication method is provided, and the method includes: determining, by a sending device, a sequence identifier of a to-be-transmitted data packet and an identifier of a first link for transmitting the data packet; sending, by the sending device, the data packet to a receiving device, where a header of the data packet includes the identifier of the first link and the sequence identifier, the identifier of the first link is used to identify the first link, and the sequence identifier is used to identify a sending order of the data packet over the first link; and receiving, by the receiving device, the data packet from the sending device, and ordering, based on the identifier of the first link and the sequence identifier, out-of-order data packets in the receiving device that are from the first link.

According to a third aspect, a communication method is provided, and the method includes: determining, by a sending device, a sequence identifier of a to-be-transmitted data packet and an identifier of a first link for transmitting the data packet; sending, by the sending device, the data packet to a receiving device, where a header of the data packet includes the identifier of the first link and the sequence identifier, the identifier of the first link is used to identify the first link, and the sequence identifier is used to identify a sending order of the data packet in a link group to which the first link belongs; and receiving, by the receiving device, the data packet from the sending device, and ordering, based on the identifier of the first link and the sequence identifier, out-of-order data packets in the receiving device that are from the link group.

For a technical effect of the second aspect or the third aspect, refer to technical effects brought by the different designs of the first aspect. Details are not described herein again.

According to a fourth aspect, a sending device is provided, and the sending device has a function of implementing the method in the first aspect. The function may be implemented by hardware, or may be implemented by hardware executing corresponding software. The hardware or the software includes one or more modules corresponding to the function.

According to a fifth aspect, a sending device is provided, including a processor and a memory, where the memory is configured to store a computer-executable instruction, and when the sending device runs, the processor executes the computer-executable instruction stored in the memory, to enable the sending device to perform the communication method in any design of the first aspect.

According to a sixth aspect, a computer-readable storage medium is provided, where the computer-readable storage medium stores an instruction, and when the instruction is run on a computer, the computer is enabled to perform the communication method in any design of the first aspect.

According to a seventh aspect, a computer program product including an instruction is provided, where when the computer program product runs on a computer, the computer is enabled to perform the communication method in any design of the first aspect.

According to an eighth aspect, a chip system is provided, where the chip system includes a processor, and the processor is configured to support a sending device in implementing the functions in the foregoing aspects, for example, determining a sequence identifier of a to-be-transmitted data packet and an identifier of a first link for transmitting the data packet. In a possible design, the chip system further includes a memory, where the memory is configured to store a program instruction and data that are necessary for a packet sending device. The chip system may include a chip, or may include a chip and another discrete device.

For a technical effect brought by any design of the fourth aspect to the eighth aspect, refer to technical effects brought by the different designs of the first aspect. Details are not described herein again.

According to a ninth aspect, a communications system is provided, where the communications system includes a sending device and a receiving device. The sending device is configured to determine a sequence identifier of a to-be-transmitted data packet and an identifier of a first link for transmitting the data packet; the sending device is further configured to send the data packet to the receiving device, where a header of the data packet includes the identifier of the first link and the sequence identifier, the identifier of the first link is used to identify the first link, and the sequence identifier is used to identify a sending order of the data packet over the first link; and the receiving device is configured to: receive the data packet from the sending device, and order, based on the identifier of the first link and the sequence identifier, out-of-order data packets in the receiving device that are from the first link.

According to a tenth aspect, a communications system is provided, where the communications system includes a sending device and a receiving device. The sending device is configured to determine a sequence identifier of a to-be-transmitted data packet and an identifier of a first link for transmitting the data packet; the sending device is further configured to send the data packet to the receiving device, where a header of the data packet includes the identifier of the first link and the sequence identifier, the identifier of the first link is used to identify the first link, and the sequence identifier is used to identify a sending order of the data packet in a link group to which the first link belongs; and the receiving device is configured to: receive the data packet from the sending device, and order, based on the identifier of the first link and the sequence identifier, out-of-order data packets in the receiving device that are from the link group.

These aspects or other aspects in this application may be made more comprehensible in descriptions in the following embodiments.

DESCRIPTION OF EMBODIMENTS

For ease of understanding technical solutions in embodiments of this application, the following first briefly describes technologies related to this application.

Service Flow:

A service flow may have different types in different networks. For example, in a fourth generation (4G) or 4.5th generation (4.5G) network, a service flow includes a packet data network (PDN) connection, a bearer, or a specific IP flow in a bearer. Alternatively, in a 5G network, a service flow includes a session, a quality of service (QoS) flow, or a specific IP flow in a QoS flow. The IP flow in the embodiments of this application is represented by a 5-tuple. The 5-tuple includes a source IP address, a destination IP address, a source port number, a destination port number, and a transport layer protocol number. A general description is provided herein, and details are not described below again.

In one embodiment, the session in the embodiments of this application may be, for example, a packet data unit (PDU) session. This is not specifically limited in the embodiments of this application. In the following embodiments of this application, an example in which the session is a PDU session is used for description. A general description is provided herein, and details are not described below again.

Figure 1:
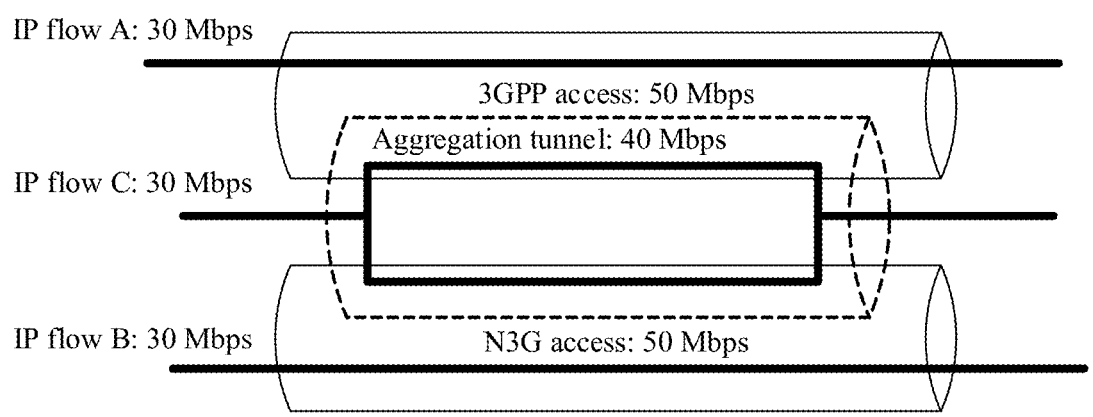
FIG. 1 is a schematic diagram of per-packet traffic splitting in the prior art.
Figure 2:
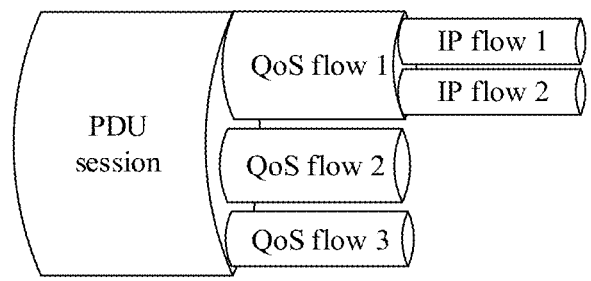
FIG. 2 is a schematic diagram of service flow distribution in a 5G network according to an embodiment of this application.

A 5G network is used as an example. As shown in FIG. 2, one PDU session includes three QoS flows: a QoS flow 1, a QoS flow 2, and a QoS flow 3. The QoS flow 1 includes an IP flow 1 and an IP flow 2. The IP flow 1 and the IP flow 2 correspond to different service flows. For example, the IP flow 1 corresponds to a vehicle-to-everything communication (vehicle to everything communication, V2X) service flow 1, and the IP flow 2 corresponds to a V2X service flow 2. If traffic splitting is performed at a PDU session granularity, a service flow in FIG. 2 includes the PDU session. If traffic splitting is performed at a QoS flow granularity, a service flow in FIG. 2 includes the QoS flow 1, the QoS flow 2, and the QoS flow 3. If traffic splitting is performed at an IP 5-tuple granularity, a service flow in FIG. 2 includes the IP flow 1 and the IP flow 2.

Service Flow Identifier:

In the embodiments of this application, in the 5G network, if the service flow is a PDU session, a service flow identifier may be a service flow identifier at a session granularity. In other words, one PDU session corresponding to a terminal may be determined based on a service flow identifier at a session granularity. For example, the service flow identifier at the session granularity may include a PDU session identifier (ID), a tunnel endpoint identifier (TEID), address information of the terminal, or the like. If the service flow is a QoS flow, a service flow identifier may be a QoS flow identifier (QFI). In other words, one QoS flow in one PDU session corresponding to a terminal may be determined based on a QFI. If the service flow is a specific IP flow in a QoS flow, a service flow identifier may be a 5-tuple or other address information that can uniquely identify the specific IP flow in the QoS flow, such as a source media access control (MAC) address and a destination MAC address. In other words, a specific IP flow in one QoS flow of one PDU session corresponding to a terminal may be determined based on a 5-tuple or other address information that can uniquely identify a specific service flow in a QoS flow. In the 4G or 4.5G network, if the service flow is a PDN connection, a service flow identifier may be a PDN connection identifier. In other words, one PDN connection corresponding to a terminal may be determined based on a PDN connection identifier. If the service flow is a bearer, a service flow identifier may be a bearer identifier. In other words, one bearer in one PDN connection corresponding to a terminal may be determined based on a bearer identifier. If the service flow is a specific IP flow in a bearer, a service flow identifier may be the foregoing 5-tuple. In other words, one specific service flow may be uniquely determined based on a 5-tuple. General descriptions are provided herein, and details are not described below again.

Correspondence between an identifier of a link and a service flow identifier (the 5G network is used as an example for description):

Case 1: One PDU session may correspond to one or more traffic splitting data links (which may also be referred to as links hereinafter), and one or more service subflows may be transmitted over one traffic splitting data link.

For example, FIG. 3a to FIG. 3d are a schematic diagram of several possible scenarios according to an embodiment of this application.

Figure 3A:
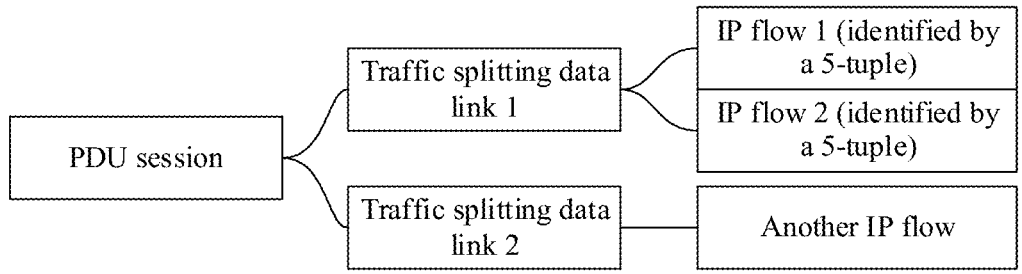
FIG. 3a to FIG. 3d are a schematic diagram 1 of a correspondence between an identifier of a link and a service flow identifier according to an embodiment of this application.

In FIG. 3a, one PDU session may correspond to a plurality of traffic splitting data links, for example, a traffic splitting data link 1, a traffic splitting data link 2, and so on. One or more IP flows may be transmitted over one traffic splitting data link. For example, an IP flow 1 and an IP flow 2 may be transmitted over the traffic splitting data link 1, and another IP flow may be transmitted over the traffic splitting data link 2. An IP flow may be identified by a 5-tuple. Therefore, in this case, a correspondence between an identifier of a link and a service flow identifier is a correspondence between an identifier of a link and a 5-tuple.

Figure 3B:
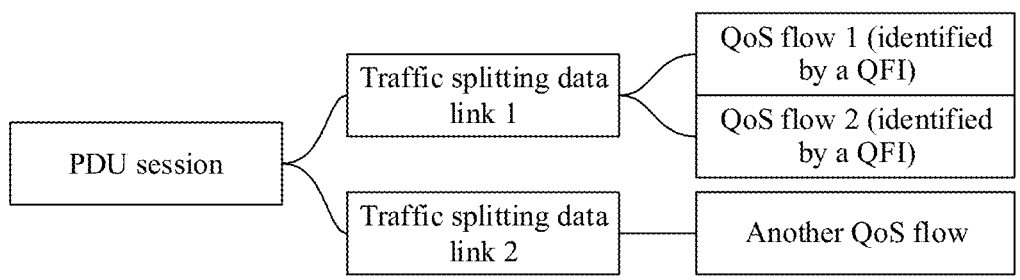

In FIG. 3b, one PDU session may correspond to a plurality of traffic splitting data links, for example, a traffic splitting data link 1, a traffic splitting data link 2, and so on. One or more QoS flows may be transmitted over one traffic splitting data link. For example, a QoS flow 1 and a QoS flow 2 may be transmitted over the traffic splitting data link 1, and another QoS flow may be transmitted over the traffic splitting data link 2. A QoS flow may be identified by a QFI. Therefore, in this case, a correspondence between an identifier of a link and a service flow identifier is a correspondence between an identifier of a link and a QFI.

Figure 3C:
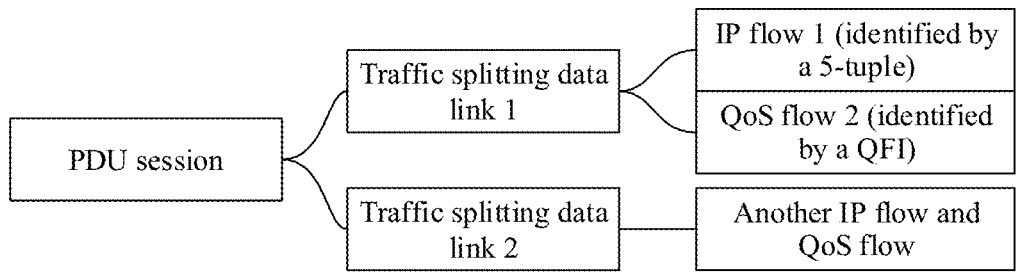

In FIG. 3c, one PDU session may correspond to a plurality of traffic splitting data links, for example, a traffic splitting data link 1, a traffic splitting data link 2, and so on. One or more IP flows or QoS flows may be transmitted over one traffic splitting data link. For example, an IP flow 1 and a QoS flow 2 may be transmitted over the traffic splitting data link 1, and another IP flow or QoS flow may be transmitted over the traffic splitting data link 2. An IP flow may be identified by a 5-tuple, and a QoS flow may be identified by a QFI. Therefore, in this case, a correspondence between an identifier of a link and a service flow identifier is a correspondence between an identifier of a link and a 5-tuple or a correspondence between an identifier of a link and a QFI.

Figure 3D:
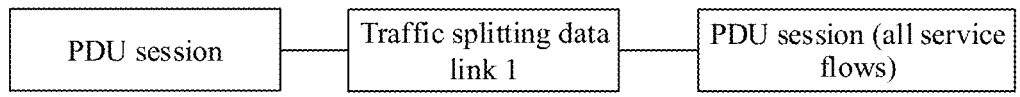

In FIG. 3d, one PDU session may correspond to one traffic splitting data link, for example, a traffic splitting data link 1. All service flows of the PDU session may be transmitted over the traffic splitting data link. In this case, a correspondence between an identifier of a link and a service flow identifier is a correspondence between an identifier of a link and a service flow identifier at a session granularity.

In one embodiment, the link in the embodiments of this application may also be referred to as a tunnel, a path, or the like. This is not specifically limited in the embodiments of this application.

Case 2: One PDU session includes one or more QoS flows, one QoS flow may correspond to one or more traffic splitting data links, and one or more IP flows may be transmitted on one traffic splitting data link.

Figure 4:
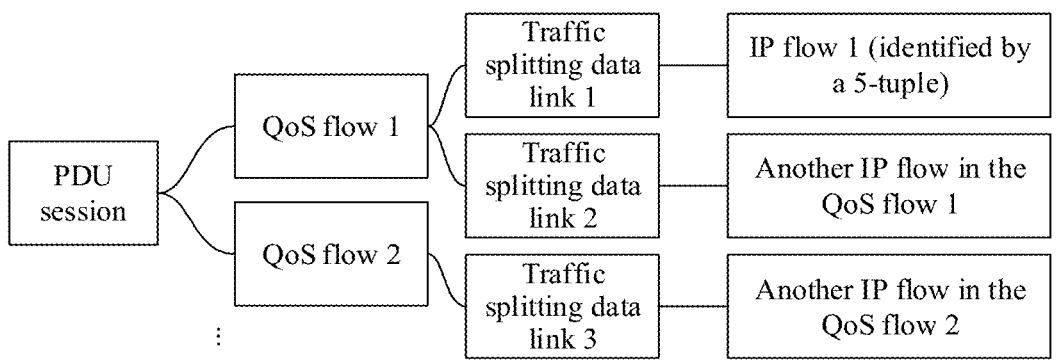
FIG. 4 is a schematic diagram 1 of a correspondence between an identifier of a link and a service flow identifier according to an embodiment of this application.

For example, FIG. 4 is a schematic diagram of a possible scenario according to an embodiment of this application.

In FIG. 4, one PDU session may include a plurality of QoS flows, for example, a QoS flow 1 and a QoS flow 2. One QoS flow may correspond to one or more traffic splitting data links, and one or more IP flows may be transmitted over one traffic splitting data link. For example, the QoS flow 1 may correspond to a traffic splitting data link 1 and a traffic splitting data link 2, an IP flow 1 may be transmitted over the traffic splitting data link 1, and another IP flow in the QoS flow 1 may be transmitted over the traffic splitting data link 2; the QoS flow 2 may correspond to a traffic splitting data link 3, and all service flows in the QoS flow 2 may be transmitted over the traffic splitting data link 3. An IP flow may be identified by a 5-tuple, and a QoS flow may be identified by a QFI. Therefore, in this case, a correspondence between an identifier of a link and a service flow identifier is a correspondence between an identifier of a link and a 5-tuple or a correspondence between an identifier of a link and a QFI.

The following describes the technical solutions in the embodiments of this application with reference to the accompanying drawings in the embodiments of this application. In descriptions of this application, "/" means "or" unless otherwise specified. For example, A/B may represent A or B. In this specification, "and/or" describes only an association relationship for describing associated objects and indicates that three relationships may exist. For example, A and/or B may represent the following three cases: Only A exists, both A and B exist, and only B exists. In addition, in the descriptions of this application, "a plurality of" means two or more than two. In addition, to clearly describe the technical solutions in the embodiments of this application, terms such as "first" and "second" are used in the embodiments of this application to distinguish between same items or similar items that have a basically same function and purpose. A person skilled in the art may understand that the terms such as "first" and "second" are not intended to limit a quantity or an execution sequence, and that the terms such as "first" and "second" do not indicate a definite difference.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, as the network architecture evolves and a new service scenario emerges, the technical solutions provided in the embodiments of this application are also applicable to similar technical problems.

Figure 5:
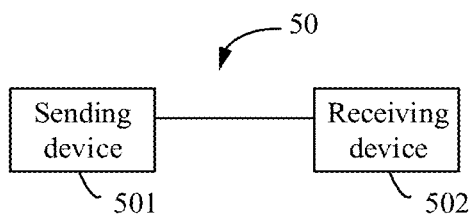
FIG. 5 is a schematic architectural diagram of a communications system according to an embodiment of this application.

FIG. 5 is a schematic architectural diagram of a communications system 50 according to an embodiment of this application. The communications system 50 includes a sending device 501 and a receiving device 502.

The sending device 501 is configured to: determine a sequence identifier of a to-be-transmitted data packet and an identifier of a first link for transmitting the data packet; and send the data packet to the receiving device 502. A header of the data packet includes the identifier of the first link and the sequence identifier, the identifier of the first link is used to identify the first link, and the sequence identifier is used to identify a sending order of the data packet over the first link.

The receiving device 502 is configured to: receive the data packet from the sending device 501, and order, based on the identifier of the first link and the sequence identifier, out-of-order data packets in the receiving device 502 that are from the first link.

Alternatively, the sending device 501 is configured to: determine a sequence identifier of a to-be-transmitted data packet and an identifier of a first link for transmitting the data packet; and send the data packet to the receiving device 502. A header of the data packet includes the identifier of the first link and the sequence identifier, the identifier of the first link is used to identify the first link, and the sequence identifier is used to identify a sending order of the data packet in a link group to which the first link belongs.

The receiving device 502 is configured to: receive the data packet from the sending device 501, and order, based on the identifier of the first link and the sequence identifier, out-of-order data packets in the receiving device 502 that are from the link group.

In one embodiment, the sending device 501 and the receiving device 502 in this embodiment of this application may directly communicate with each other, or may communicate with each other through forwarding by another device. This is not specifically limited in this embodiment of this application.

Based on the communications system provided in this embodiment of this application, when sending the data packet, the sending device first determines the sequence identifier of the to-be-transmitted data packet and the identifier of the first link for transmitting the data packet, and adds the identifier of the first link and the sequence identifier to the header of the data packet, so that after receiving the data packet from the sending device, the receiving device can order, based on the identifier of the first link and the sequence identifier, the out-of-order data packets in the receiving device that are from the first link or the link group to which the first link belongs. Therefore, an out-of-order problem caused by per-packet traffic splitting can be resolved. Further, packet loss at a TCP layer above an IP layer can be reduced, and frame skipping and frame freezing due to out-of-order do not occur when streaming media service data is transmitted at a UDP layer above the IP layer, so that user experience is improved.

In one embodiment, the communications system 50 shown in FIG. 5 may be applied to a 5G network and another future network, and may be theoretically migrated to a current 4G network or 4.5G network. This is not specifically limited in this embodiment of the present invention.

Figure 6:
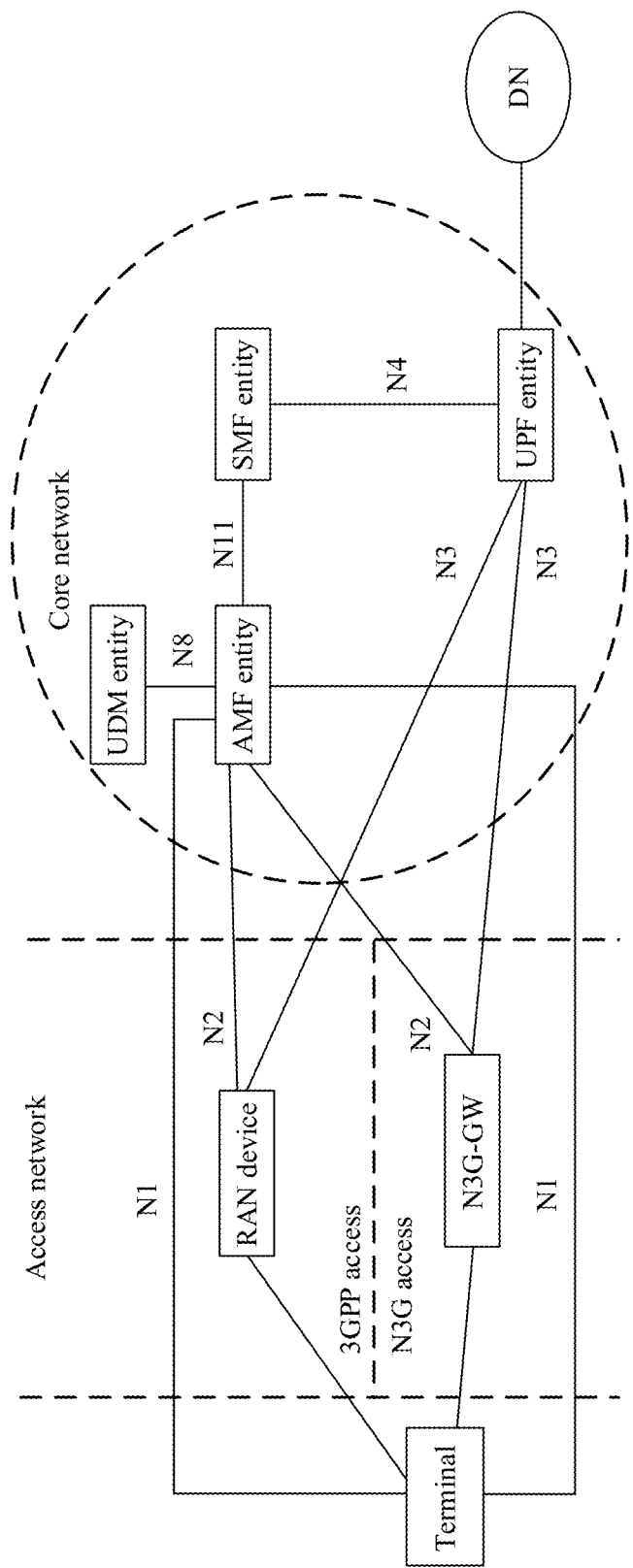
FIG. 6 is a schematic architectural diagram of a 5G network according to an embodiment of this application.

An example in which the communications system 50 is applied to a 5G network is used. FIG. 6 is a schematic architectural diagram of a 5G network according to an embodiment of this application. The architecture not only supports a terminal in accessing a 5G core network by using a 3GPP access technology, but also supports the terminal in accessing the 5G core network by using an N3G access technology.

As shown in FIG. 6, when accessing the 5G core network by using the 3GPP access technology, the terminal accesses the 5G core network by using a radio access network (RAN) device; when accessing the 5G core network by using the N3G access technology, the terminal accesses the 5G core network by using an N3G access gateway (N3G-GW). The 5G core network may include an access and mobility management function (AMF) entity, a user plane function (UPF) entity, a session management function (SMF) entity, and a unified data management (UDM) entity. The RAN device or the N3G-GW may access a data network (DN) by using the UPF entity.

In addition, the 5G core network may further include an authentication server function (AUSF) entity, a policy control function (PCF) entity, and the like. This is not specifically limited in this embodiment of this application.

The terminal communicates with the AMF entity through a next generation (N) network interface 1 (N1 for short). The RAN device or the N3G-GW communicates with the AMF entity through an N2 interface (N2 for short). The RAN device or the N3G-GW communicates with the UPF entity through an N3 interface (N3 for short). The AMF entity communicates with the UDM entity through an N8 interface (N8 for short). The AMF entity communicates with the SMF entity through an N11 interface (N11 for short). The SMF entity communicates with the UPF entity through an N4 interface (N4 for short).

It should be noted that, names of the interfaces between network elements in FIG. 6 are merely examples, and the interfaces may have other names in specific implementation. This is not specifically limited in this embodiment of this application.

It should be noted that the RAN device, the N3G-GW, the SMF entity, the UPF entity, the AMF entity, the UDM entity, and the like in FIG. 6 are merely names, and the names do not constitute any limitation on the devices. In the 5G network and another future network, network elements or entities corresponding to the RAN device, the N3G-GW, the SMF entity, the UPF entity, the AMF entity, and the UDM entity may have other names. This is not specifically limited in this embodiment of this application. For example, the UDM entity may be replaced by a home subscriber server (HSS), a user subscription database (USD) entity, or a database entity. The N3G-GW may be replaced by a next generation packet data gateway (NG-PDG) or a non-3GPP interworking function (N3IWF) entity, an untrusted non-3GPP access gateway, a trusted non-3GPP access gateway, a fixed network access gateway function (AGF), or the like. General descriptions are provided herein, and details are not described below again.

In one embodiment, in the communications system 50 shown in FIG. 5, the sending device 501 may be specifically the terminal in FIG. 6, and the receiving device 502 may be specifically the UPF entity in FIG. 6. Alternatively, in the communications system 50 shown in FIG. 5, the sending device 501 may be specifically the UPF entity in FIG. 6, and the receiving device 502 may be specifically the terminal in FIG. 6. This is not specifically limited in this embodiment of this application.

In one embodiment, the 3GPP access technology in this embodiment of this application may be a 5G RAN radio access technology, or another future 3GPP access technology. The N3G access technology in this embodiment of this application may be a wireless fidelity (WiFi) access technology, a wireless local area network (WLAN) access technology, a fixed network access technology, or another future N3G access technology. This is not specifically limited in this embodiment of this application.

In one embodiment, the terminal of this application may include various handheld devices, vehicle-mounted devices, wearable devices, and computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem, a handheld (handheld) device, a laptop computer, a cordless phone or a wireless local loop (WLL) station, a machine type communication (MTC) terminal, user equipment (UE), a mobile station (MS), a terminal device, or the like. For ease of description, in this application, the devices mentioned above are collectively referred to as terminals.

In one embodiment, the RAN device in this embodiment of this application is a device that accesses the 5G core network by using the 3GPP access technology. For example, the RAN device may be a base station, a broadband network gateway (BNG), an aggregation switch, or the like. This is not specifically limited in this embodiment of this application. The base station may include various types of base stations, such as a macro base station, a micro base station (also referred to as a small cell), a relay node, and an access point. This is not specifically limited in this embodiment of this application.

In one embodiment, the N3G-GW in this embodiment of this application is a device that accesses the 5G core network by using the N3G access technology. For example, the N3G-GW may be a broadband network gateway (BNG), a broadband remote access server (BRAS), a fixed network access gateway, or a wireless local area network (WLAN) access gateway. This is not specifically limited in this embodiment of this application.

In one embodiment, the sending device 501 and the receiving device 502 in FIG. 5 may be implemented by using one physical device or a plurality of physical devices, or may be implemented by using a logical functional module in a physical device. This is not specifically limited in this embodiment of this application.

Figure 7:
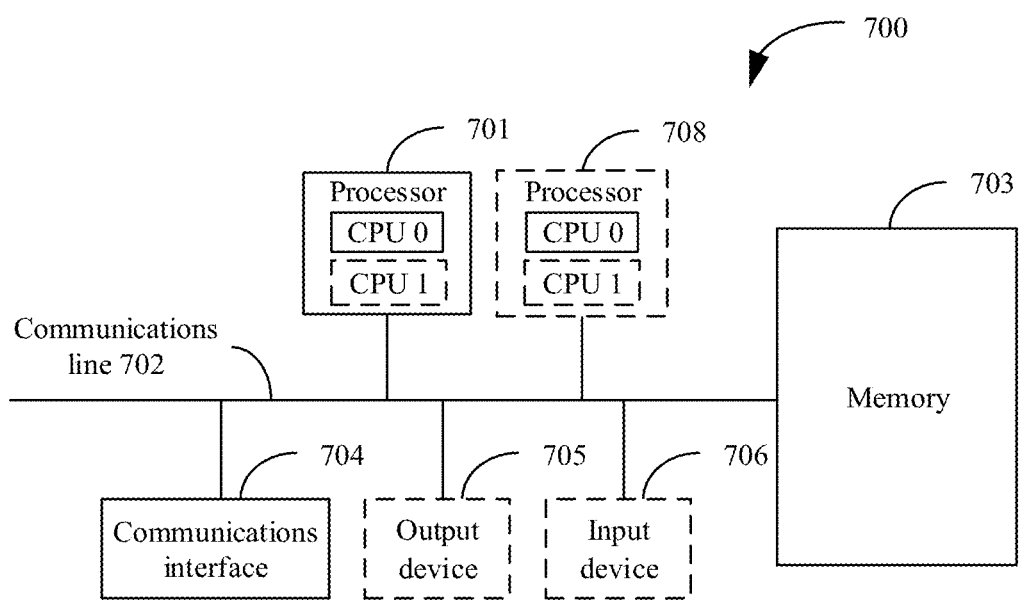
FIG. 7 is a schematic diagram of a hardware structure of a communications device according to an embodiment of this application.

For example, the sending device 501 or the receiving device 502 in FIG. 5 may be implemented by using a communications device in FIG. 7. FIG. 7 is a schematic diagram of a hardware structure of a communications device according to an embodiment of this application. The communications device 700 includes at least one processor 701, a communications line 702, a memory 703, and at least one communications interface 704.

The processor 701 may be a general-purpose central processing unit (CPU), a microprocessor, an application-specific integrated circuit (ASIC), or one or more integrated circuits configured to control program execution of the solutions of this application.

The communications line 702 may include a path for transmitting information between the foregoing components.

The communications interface 704, which uses any apparatus such as a transceiver, is configured to communicate with another device or communications network, such as an Ethernet, a radio access network, or a wireless local area network.

The memory 703 may be a read-only memory (ROM), another type of static storage device that can store static information and an instruction, or a random access memory (RAM), or another type of dynamic storage device that can store information and an instruction, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, or the like), a magnetic disk storage medium or another magnetic storage device, or any other medium that can carry or store expected program code in a form of an instruction or a data structure and can be accessed by a computer, but is not limited thereto. The memory may exist independently and is connected to the processor by using the communications line 702. The memory may be integrated with the processor.

The memory 703 is configured to store a computer-executable instruction for executing the solutions of this application, and the processor 701 controls the execution. The processor 701 is configured to execute the computer-executable instruction stored in the memory 703, to implement a communication method provided in the following embodiments of this application.

In one embodiment, the computer-executable instruction in this embodiment of this application may also be referred to as application program code. This is not specifically limited in this embodiment of this application.

During specific implementation, in an embodiment, the processor 701 may include one or more CPUs, for example, a CPU 0 and a CPU 1 in FIG. 7.

During specific implementation, in an embodiment, the communications device 700 may include a plurality of processors, for example, the processor 701 and a processor 708 in FIG. 7. Each of the processors may be a single-core (single-CPU) processor or a multi-core (multi-CPU) processor. The processor herein may be one or more devices, circuits, and/or processing cores for processing data (for example, a computer program instruction).

During specific implementation, in an embodiment, the communications device 700 may further include an output device 705 and an input device 706. The output device 705 communicates with the processor 701, and may display information in a plurality of manners. For example, the output device 705 may be a liquid crystal display (LCD), a light emitting diode (LED) display device, a cathode ray tube (cathode ray tube, CRT) display device, a projector (projector), or the like. The input device 706 communicates with the processor 701, and may receive an input of a user in a plurality of manners. For example, the input device 706 may be a mouse, a keyboard, a touchscreen device, a sensor device, or the like.

The communications device 700 may be a general-purpose device or a dedicated device. During specific implementation, the communications device 700 may be a desktop computer, a portable computer, a network server, a palmtop computer, a mobile phone, a tablet computer, a wireless terminal device, an embedded device, or a device with a structure similar to that in FIG. 7. A type of the communications device 700 is not limited in this embodiment of this application.

The following describes in detail a communication method provided in embodiments of this application with reference to FIG. 1 to FIG. 7.

It should be noted that, names of messages between network elements in the following embodiment of this application are merely examples, and the messages may have other names in specific implementation. This is not specifically limited in this embodiment of this application.

Figure 8A:
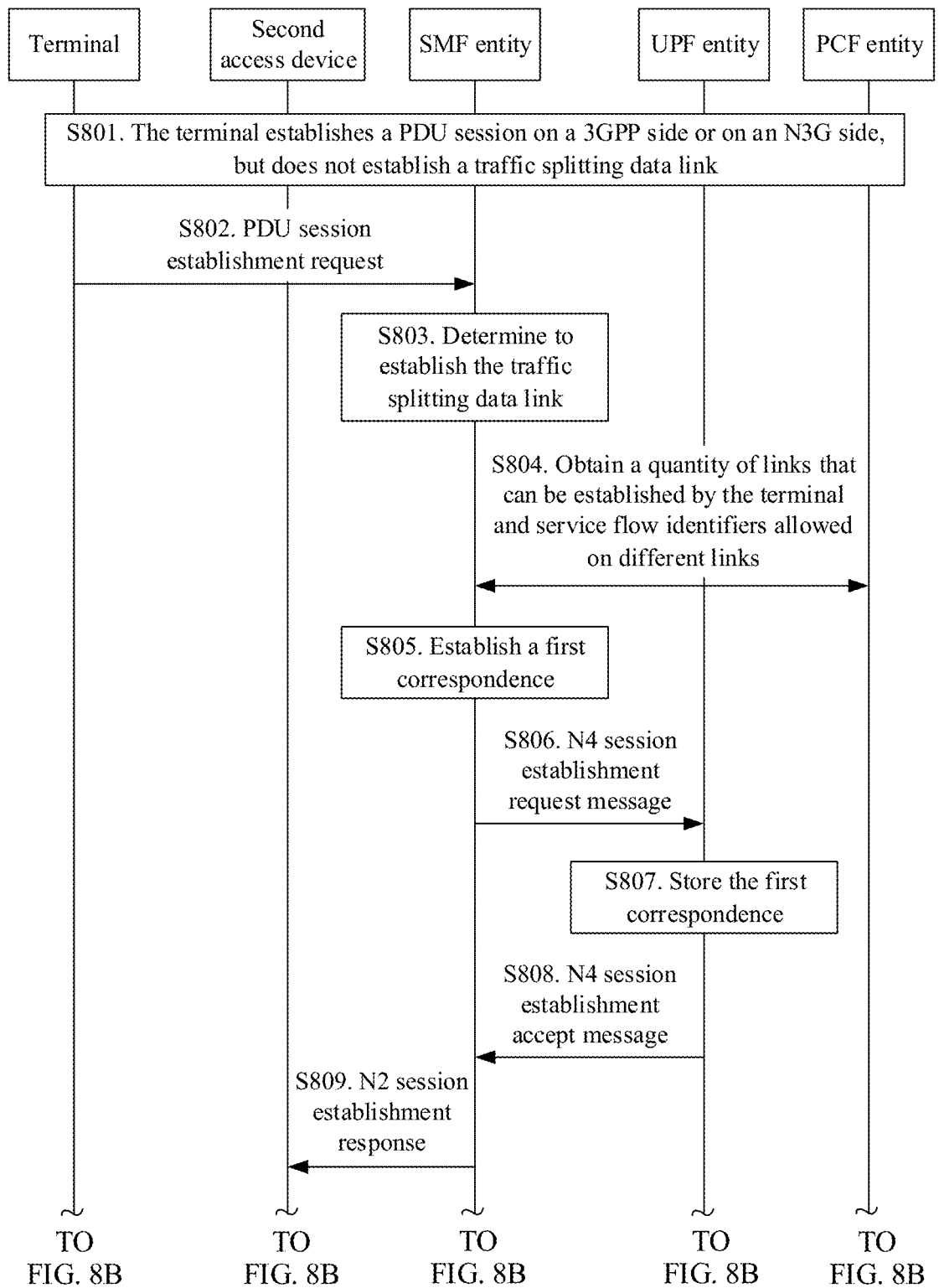
FIG. 8A and FIG. 8B are a schematic flowchart 1 of a communication method according to an embodiment of this application.
Figure 8B:
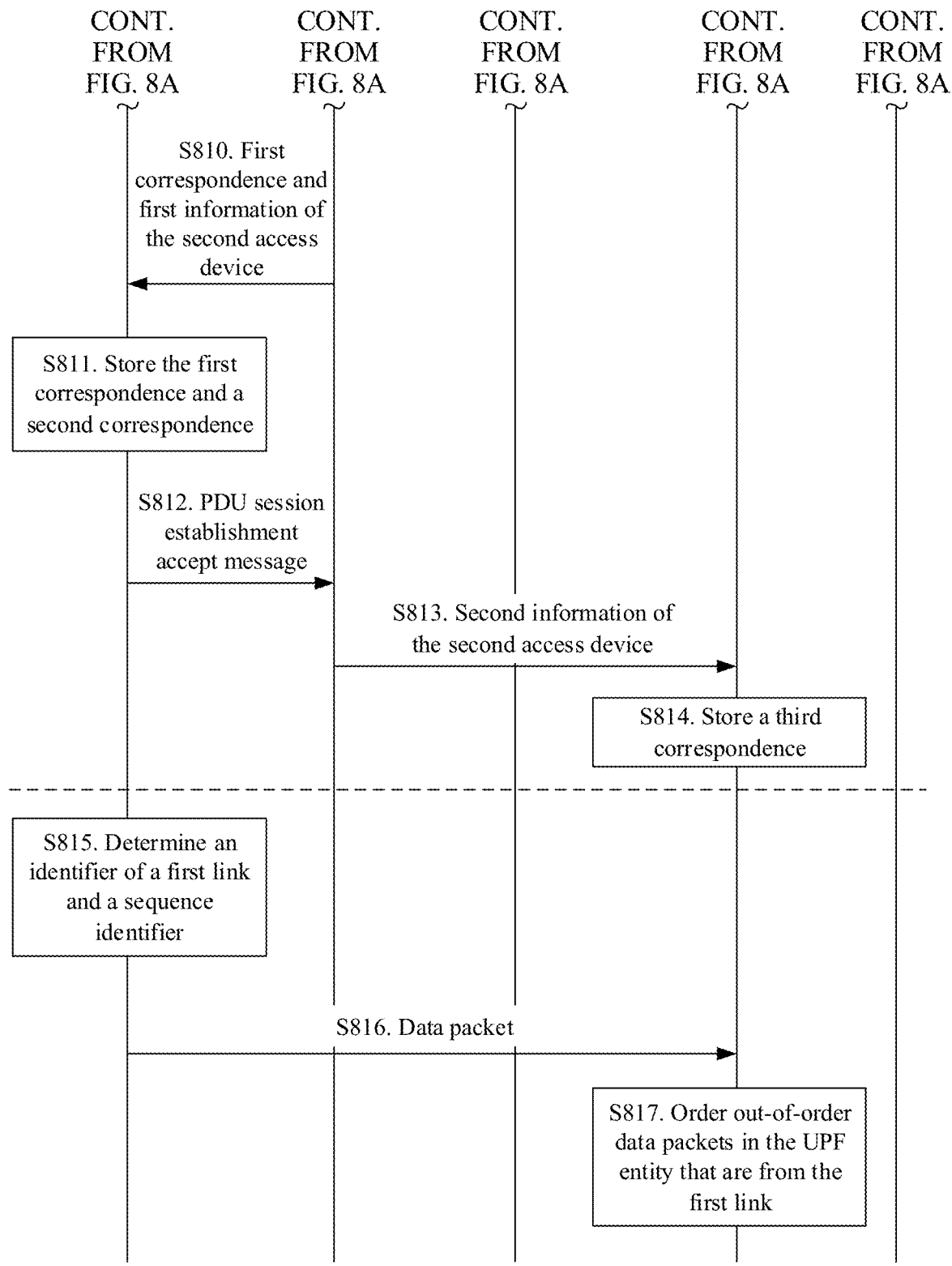

For example, the communications system shown in FIG. 5 is applied to the 5G network shown in FIG. 6. FIG. 8A and FIG. 8B show a communication method according to an embodiment of this application. The method includes the following operations.

S801. A terminal establishes a PDU session on a 3GPP side or on an N3G side, but does not establish a traffic splitting data link.

If the PDU session is established on the 3GPP side in operation S801, a corresponding first access device (not shown in the figure) may be the RAN device in FIG. 6. If the PDU session is established on the N3G side in operation S801, a corresponding first access device (not shown in the figure) may be the N3G-GW in FIG. 6. A general description is provided herein, and details are not described below again.

Optionally, in one embodiment of this application, the first access device is an access device corresponding to a first access technology, and a second access device is an access device corresponding to a second access technology. The first access technology may be a 3GPP access technology, and the second access technology may be an N3G access technology. Alternatively, the first access technology may be an N3G access technology, and the second access technology may be a 3GPP access technology. This is not specifically limited in this embodiment of this application.

For a specific implementation of establishing the PDU session by the terminal on the 3GPP side or the N3G side, refer to an existing PDU session establishment manner. Details are not described herein.

S802. The terminal initiates a PDU session establishment procedure, and sends a PDU session establishment request to an SMF entity, so that the SMF entity receives the PDU session establishment request from the terminal. The PDU session establishment request carries a PDU session identifier of the PDU session established in operation S801.

If the PDU session is established on the 3GPP side in operation S801, a PDU session is established on the N3G side in operation S802, and in this case, a corresponding second access device may be the N3G-GW in FIG. 6. If the PDU session is established on the N3G side in operation S801, a PDU session is established on the 3GPP side in operation S802, and in this case, a corresponding second access device may be the RAN device in FIG. 6. A general description is provided herein, and details are not described below again.

S803. The SMF entity determines to establish the traffic splitting data link.

If the SMF entity determines that the PDU session identifier carried in the PDU session establishment request exists, and a request type of the PDU session establishment request is an initial request, the SMF entity determines that a purpose of the PDU session establishment request is to establish the traffic splitting data link.

S804. The SMF entity obtains, from a PCF entity, a quantity of links that can be established by the terminal and service flow identifiers allowed on different links.

The quantity of links that can be established by the terminal and the service flow identifiers allowed on different links may be preconfigured by an operator on the PCF entity. This is not specifically limited in this embodiment of this application.

S805. The SMF entity allocates a corresponding quantity of identifiers of the links based on the quantity of links that can be established by the terminal and the service flow identifiers allowed on different links, and establishes a first correspondence.

In one embodiment, the first correspondence may be a correspondence between the identifier of the link and the service flow identifier, as shown in Table 1. Alternatively, as shown in FIG. 3a to FIG. 3d, one PDU session may correspond to one or more traffic splitting data links, and in this case, the first correspondence may be a correspondence between a PDU session ID, the identifier of the link, and the service flow identifier, as shown in Table 2. Alternatively, as shown in FIG. 4, one QoS flow may correspond to one or more traffic splitting data links, and in this case, the first correspondence may be a correspondence between a PDU session ID, a QFI, the identifier of the link, and the service flow identifier, as shown in Table 3. For a related description of the correspondence between the identifier of the link and the service flow identifier, refer to the embodiments shown in FIG. 3a to FIG. 3d and FIG. 4. Details are not described herein again.

TABLE 1

| Identifier of the link | Service flow identifier |
|---|---|
| A | QFI 1 |
| A | QFI 2 |
| B | 5-tuple 1 |
| E | Service flow identifier at a session granularity |
| ... | ... |

TABLE 2

| PDU session ID | Identifier of the link | Service flow identifier |
|---|---|---|
| ID 1 | A | QFI 1 |
| ID 1 | A | QFI 2 |
| ID 1 | B | 5-tuple 1 |
| ID 2 | E | Service flow identifier at a session granularity |
| ... | ... | ... |

TABLE 3

| PDU session ID | QFI | Identifier of the link | Service flow identifier |
|---|---|---|---|
| ID 1 | QFI 1 | C | 5-tuple 1 |
| ID 1 | QFI 1 | C | 5-tuple 2 |
| ID 1 | QFI 2 | D | QFI 2 |
| ID 2 | QFI 3 | E | Service flow identifier at a session granularity |
| ... | ... | ... | ... |

S806. The SMF entity sends an N4 session establishment request message to a UPF entity, so that the UPF entity receives the N4 session establishment request message from the SMF entity, where the N4 session establishment request message carries the first correspondence.

S807. The UPF entity stores the first correspondence.

S808. The UPF entity sends an N4 session establishment accept message to the SMF entity, so that the SMF entity receives the N4 session establishment accept message from the UPF entity, where the N4 session establishment accept message carries uplink path information.

The uplink path information in this embodiment of this application may include an N3 interface address of the UPF entity, an endpoint address or an endpoint identifier of an N3 tunnel on a side of the UPF entity, and the like. This is not specifically limited in this embodiment of this application.

Optionally, in one embodiment of this application, the N3 interface address of the UPF entity may also be referred to as an address of the UPF entity oriented to the second access device. This is not specifically limited in this embodiment of this application.

S809. The SMF entity sends an N2 session establishment response to the second access device, so that the second access device receives the N2 session establishment response from the SMF entity, where the N2 session establishment response carries the uplink path information and the first correspondence.

After receiving the uplink path information from the SMF entity, the second access device may store the uplink path information. For details, refer to an existing implementation. Details are not described herein.

S810. After an air interface connection is configured between the second access device and the terminal, the second access device sends the first correspondence and first information of the second access device to the terminal, so that the terminal receives the first correspondence and the first information of the second access device from the access device.

Optionally, in one embodiment of this application, the first information of the second access device may be, for example, an air interface address of the second access device. The air interface address of the second access device may also be referred to as an address of the second access device oriented to the terminal. This is not specifically limited in this embodiment of this application.

S811. The terminal stores a second correspondence and the received first correspondence, where the second correspondence is a correspondence between the identifier of the link and the first information of the second access device.

To be specific, if the first correspondence is shown in Table 1, it is equivalent that the terminal establishes a correspondence between the identifier of the link, the service flow identifier, and the first information of the second access device; or if the first correspondence is shown in Table 2, it is equivalent that the terminal establishes a correspondence between the PDU session ID, the identifier of the link, the service flow identifier, and the first information of the second access device; or if the first correspondence is shown in Table 3, it is equivalent that the terminal establishes a correspondence between the PDU session ID, the QFI, the identifier of the link, the service flow identifier, and the first information of the second access device.

When the terminal establishes the PDU session on the 3GPP side or on the N3G side in operation S801, the terminal may store a correspondence between the PDU session ID and first information of the first access device. Therefore, if the first correspondence is shown in Table 2, it is equivalent that a correspondence between the PDU session ID, the identifier of the link, the service flow identifier, the first information of the first access device, and the first information of the second access device is established; or if the first correspondence is shown in Table 3, it is equivalent that a correspondence between the PDU session ID, the QFI, the identifier of the link, the service flow identifier, the first information of the first access device, and the first information of the second access device is established.

Optionally, in one embodiment of this application, the first information of the first access device may be, for example, an air interface address of the first access device. The air interface address of the first access device may also be referred to as an address of the first access device oriented to the terminal. This is not specifically limited in this embodiment of this application.

Optionally, in one embodiment of this application, the first correspondence and the second correspondence may be stored in a plurality of forms. For example, after the first correspondence shown in Table 2 is stored, a second correspondence shown in Table 4 may be stored. In this case, the identifier of the link needs to be stored twice. Alternatively, as shown in Table 5, the first correspondence and the second correspondence may be associated by using the identifier of the link and stored together. In this case, the identifier of the link does not need to be repeatedly stored, so that storage space is saved. A form in which the first correspondence and the second correspondence are stored is not specifically limited in this embodiment of this application.

TABLE 4

| Identifier of the link | First information of the second access device |
|---|---|
| A | IP address 1 |
| A | IP address 1 |
| B | IP address 1 |
| E | IP address 1 |
| . . . | . . . |

TABLE 5

| PDU session ID | Identifier of the link | Service flow identifier | First information of the second access device |
|---|---|---|---|
| ID 1 | A | QFI 1 | IP address 1 |
| ID 1 | A | QFI 2 | IP address 1 |
| ID 1 | B | 5-tuple 1 | IP address 1 |
| ID 2 | E | Service flow identifier at a session granularity | IP address 1 |
| . . . | . . . | . . . | . . . |

Certainly, the first information of the second access device in Table 4 or Table 5 may not be repeatedly stored. For example, another form of Table 5 may be shown in Table 6. This is not specifically limited in this embodiment of this application.

TABLE 6

| PDU session ID | Identifier of the link | Service flow identifier | First information of the second access device |
|---|---|---|---|
| ID 1 | A | QFI 1 | IP address 1 |
| ID 1 | A | QFI 2 | |
| ID 1 | B | 5-tuple 1 | |
| ID 2 | E | Service flow identifier at a session granularity | |
| . . . | . . . | . . . | |

It should be noted that, the foregoing forms in which the first correspondence and the second correspondence are stored may be applicable to storage of all associated correspondences in this embodiment of this application. A general description is provided herein, and details are not described below again. For example, in this embodiment of this application, correspondences shown in Table 7, Table 2, and Table 4 may be separately stored. In this case, the PDU session ID and the identifier of the link each need to be stored twice. Alternatively, as shown in Table 8, correspondences shown in Table 7, Table 2, and Table 4 may be associated by using the identifier of the link and the PDU session ID and stored together. In this case, neither the identifier of the link nor the PDU session ID needs to be repeatedly stored, so that storage space is saved.

TABLE 7

| PDU session ID | First information of the first access device |
|---|---|
| ID 1 | IP address 2 |
| ID 1 | |
| ID 1 | |
| ID 2 | |
| . . . | |

TABLE 8

| PDU session ID | Identifier of the link | Service flow identifier | First information of the second access device | First information of the first access device |
|---|---|---|---|---|
| ID 1 | A | QFI 1 | IP address 1 | IP address 2 |
| ID 1 | A | QFI 2 | | |
| ID 1 | B | 5-tuple 1 | | |
| ID 2 | E | Service flow identifier at a session granularity | | |
| . . . | . . . | . . . | | |

S812. The terminal sends a PDU session establishment accept (PDU session establishment accept) message to the second access device, so that the second access device receives the PDU session establishment accept message from the terminal.

S813. The second access device sends second information of the second access device to the UPF entity, so that the UPF entity receives the second information of the second access device from the terminal.

In one embodiment of this application, the second information of the second access device may include, for example, an N3 interface address of the second access device, or an endpoint address or an endpoint identifier of the N3 tunnel on a side of the second access device. This is not specifically limited in this embodiment of this application.

Optionally, in one embodiment of this application, the second information of the second access device may also be referred to as second downlink path information, and the N3 interface address of the second access device may also be referred to as an address of the second access device oriented to the UPF entity. This is not specifically limited in this embodiment of this application.

S814. The UPF entity stores a third correspondence, where the third correspondence is a correspondence between the identifier of the link and the second information of the second access device.

In one embodiment, if the first correspondence stored in operation S807 is shown in Table 1, it is equivalent that a correspondence between the identifier of the link, the service flow identifier, and the second information of the second access device is established.

In one embodiment, if the first correspondence stored in operation S807 is shown in Table 2, it is equivalent that a correspondence between the PDU session ID, the identifier of the link, the service flow identifier, and the second information of the second access device is established. Further, when the terminal establishes the PDU session on the 3GPP side or on the N3G side in operation S801, the UPF entity may store a correspondence between the PDU session ID and information of the first access device. Therefore, in this case, it is equivalent that a correspondence between the PDU session ID, the identifier of the link, the service flow identifier, second information of the first access device, and the second information of the second access device is established.

In one embodiment, if the first correspondence stored in operation S807 is shown in Table 3, it is equivalent that a correspondence between the PDU session ID, the QFI, the identifier of the link, the service flow identifier, and the second information of the second access device is established. Further, when the terminal establishes the PDU session on the 3GPP side or on the N3G side in operation S801, the UPF entity may store a correspondence between the PDU session ID and second information of the first access device. Therefore, in this case, it is equivalent that a correspondence between the PDU session ID, the QFI, the identifier of the link, the service flow identifier, the second information of the first access device, and the second information of the second access device is established.

In one embodiment of this application, the second information of the first access device may include, for example, an N3 interface address of the first access device, or an endpoint address or an endpoint identifier of an N3 tunnel on a side of the first access device. This is not specifically limited in this embodiment of this application.

Optionally, in one embodiment of this application, the second information of the first access device may also be referred to as first downlink path information, and the N3 interface address of the first access device may also be referred to as an address of the first access device oriented to the UPF entity. This is not specifically limited in this embodiment of this application.

The following further describes the communication method provided in this embodiment of this application by using an example in which a sending device is the terminal, and a receiving device is the UPF entity, that is, the terminal sends a data packet to the UPF entity. The communication method further includes the following operations.

S815. The terminal determines a sequence identifier of a to-be-transmitted data packet and an identifier of a first link for transmitting the data packet.

In one embodiment of this application, one link uses one sending sequence. For example, in this embodiment of this application, data packets to be transmitted over the first link may be numbered, for example, 1, 2, 3, 4, and so on, according to a sending order.

Optionally, in one embodiment of this application, the terminal may determine, based on the first correspondence stored in operation S811, the identifier of the first link for transmitting the data packet.

In one embodiment, if a service flow identifier includes a 5-tuple, that the terminal determines, based on a correspondence between the identifier of the first link and the service flow identifier, the identifier of the first link for transmitting the data packet includes: determining, by the terminal based on a 5-tuple of the data packet and a correspondence between the identifier of the first link and the 5-tuple, the identifier of the first link for transmitting the data packet.

Alternatively, in a possible embodiment, if a service flow identifier includes a QFI or a service flow identifier at a session granularity, that the terminal determines, based on a correspondence between the identifier of the first link and the service flow identifier, the identifier of the first link for transmitting the data packet includes: determining, by the terminal, the service flow identifier based on a 5-tuple of the data packet; and determining, by the terminal based on the service flow identifier and the correspondence between the identifier of the first link and the service flow identifier, the identifier of the first link for transmitting the data packet.

S816. The terminal sends the data packet to the UPF entity, so that the UPF entity receives the data packet from the terminal.

A header of the data packet includes the identifier of the first link and the sequence identifier, the identifier of the first link is used to identify the first link, and the sequence identifier is used to identify a sending order of the data packet over the first link.

Figure 9:
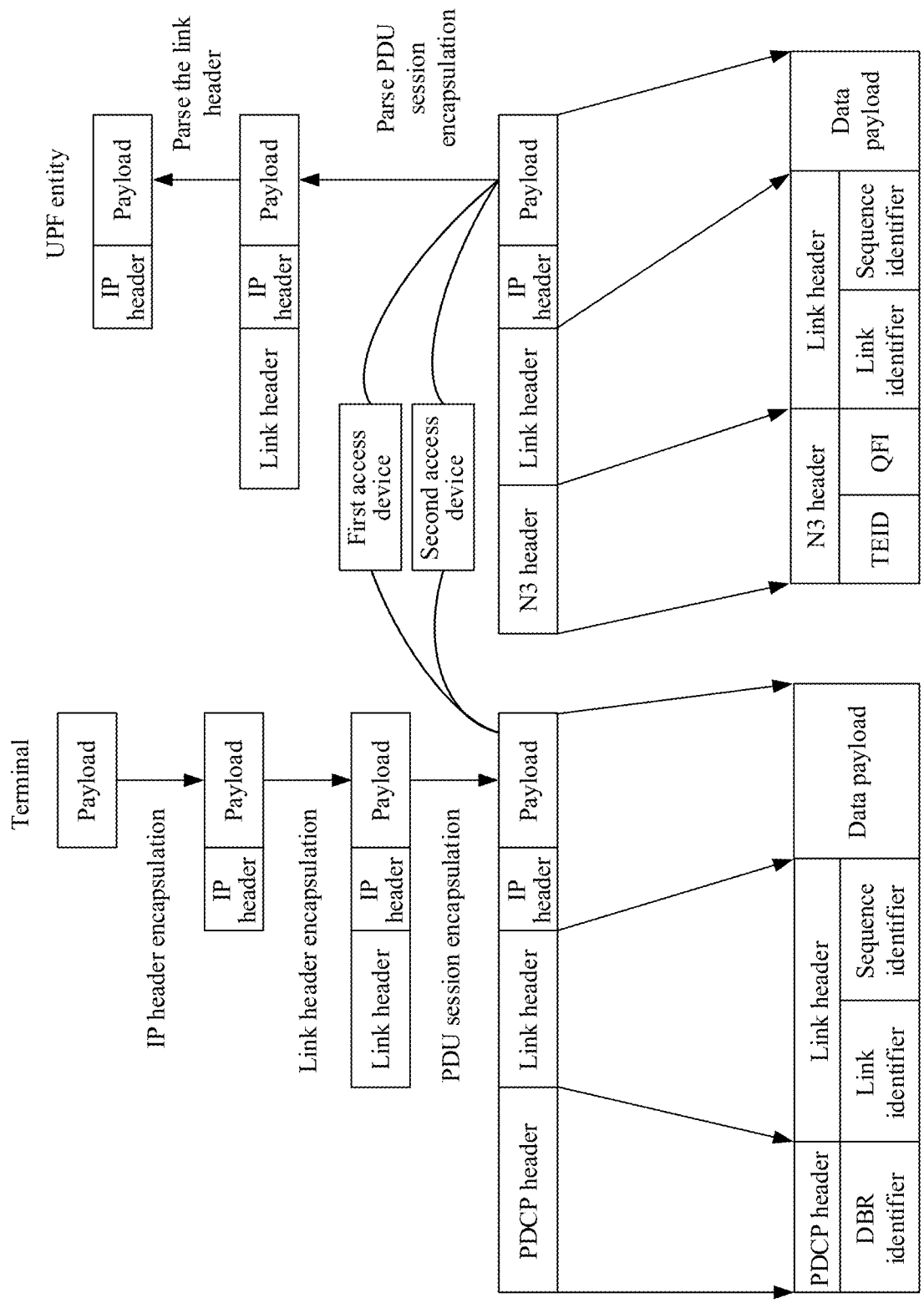
FIG. 9 is a schematic flowchart of encapsulation and parsing of a data packet according to an embodiment of this application.

In one embodiment, as shown in FIG. 9, it is assumed that a payload (payload) in FIG. 9 corresponds to one data packet. In this embodiment of this application, when encapsulating a payload (payload), the terminal first encapsulates the payload with an IP header, to obtain an IP data packet, then encapsulates the IP data packet with a link header (header), and further performs PDU session encapsulation, by using a packet data convergence protocol (packet data convergence protocol, PDCP) header, on the IP data packet encapsulated with the link header. The IP data packet includes the IP header and the payload, and corresponds to a data payload (data payload) field. The link header includes the identifier of the first link and a sequence identifier, and corresponds to a link header field. The PDCP header includes a data radio bearer (data radio bearer, DRB) identifier, and corresponds to a PDCP header field. The identifier of the first link and the sequence identifier may be determined in a manner in operation S814. The DBR identifier may be determined based on an IP 5-tuple in the IP header. A general description is provided herein, and details are not described below again.

Optionally, in one embodiment of this application, when an IP data packet is encapsulated with a link header, if there is no correspondence between the first link identifier and the service flow identifier, a default link may be used as the first link. This is not specifically limited in this embodiment of this application.

Optionally, in one embodiment of this application, when sending the data packet to the UPF entity, the terminal may determine, based on a correspondence between the PDU session ID, information of the first access device, and information of the second access device, that the data packet may be sent to the UPF entity by using the first access device or the second access device, and then the terminal may select the first access device or the second access device, to send the data packet to the UPF entity. A manner in which the terminal selects an access device is not limited in this embodiment of this application.

S817. The UPF entity orders, based on the identifier of the first link and the sequence identifier, out-of-order data packets in the UPF entity that are from the first link.

Optionally, as shown in FIG. 9, in one embodiment of this application, after receiving the data packet from the terminal, the UPF entity first parses PDU session encapsulation to obtain an N3 header, and may determine, based on the N3 header obtained by parsing, whether the data packet is a traffic splitting data packet. For example, a PDU session ID may be determined based on a TEID in the N3 header obtained by parsing and a prestored correspondence between the TEID and the PDU session ID. Further, if the PDU session ID is included in a correspondence that is between a PDU session ID and the identifier of the link and that is stored in the UPF entity, it may be determined whether the data packet is a traffic splitting data packet. Then, the UPF entity parses the link header to obtain the identifier of the first link and the sequence identifier, and orders, based on the identifier of the first link and the sequence identifier, the out-of-order data packets in the UPF entity that are from the first link. Optionally, in this embodiment of this application, after ordering the out-of-order data packets that are from the first link, the UPF entity may further send the ordered data packets to a target device or deliver the ordered data packets to an upper protocol layer for processing (not shown in the figure). This is not specifically limited in this embodiment of this application.

It should be noted that, in this embodiment of this application, after receiving the encapsulated data packet from the terminal, an access device needs to parse the PDCP header to obtain the DRB identifier. Then, after determining, based on a correspondence between the DRB identifier, and a TEID and QFI, the TEID and QFI that correspond to the DRB identifier obtained by parsing, the access device performs, by using the N3 header, the PDU session encapsulation on the IP data packet encapsulated with the link header. The N3 header includes the TEID and QFI. For details, refer to an existing implementation. Details are not described in this embodiment of this application.

Operations S815 to S817 are described by using the example in which the terminal sends a data packet to the UPF entity. Optionally, the UPF entity may also send a data packet to the terminal, and a solution is similar to the solution in which the terminal sends a data packet to the UPF entity, except that the sending device is changed from the terminal to the UPF entity and the receiving device is changed from the UPF entity to the terminal. Details are not described herein again.

Figure 10:
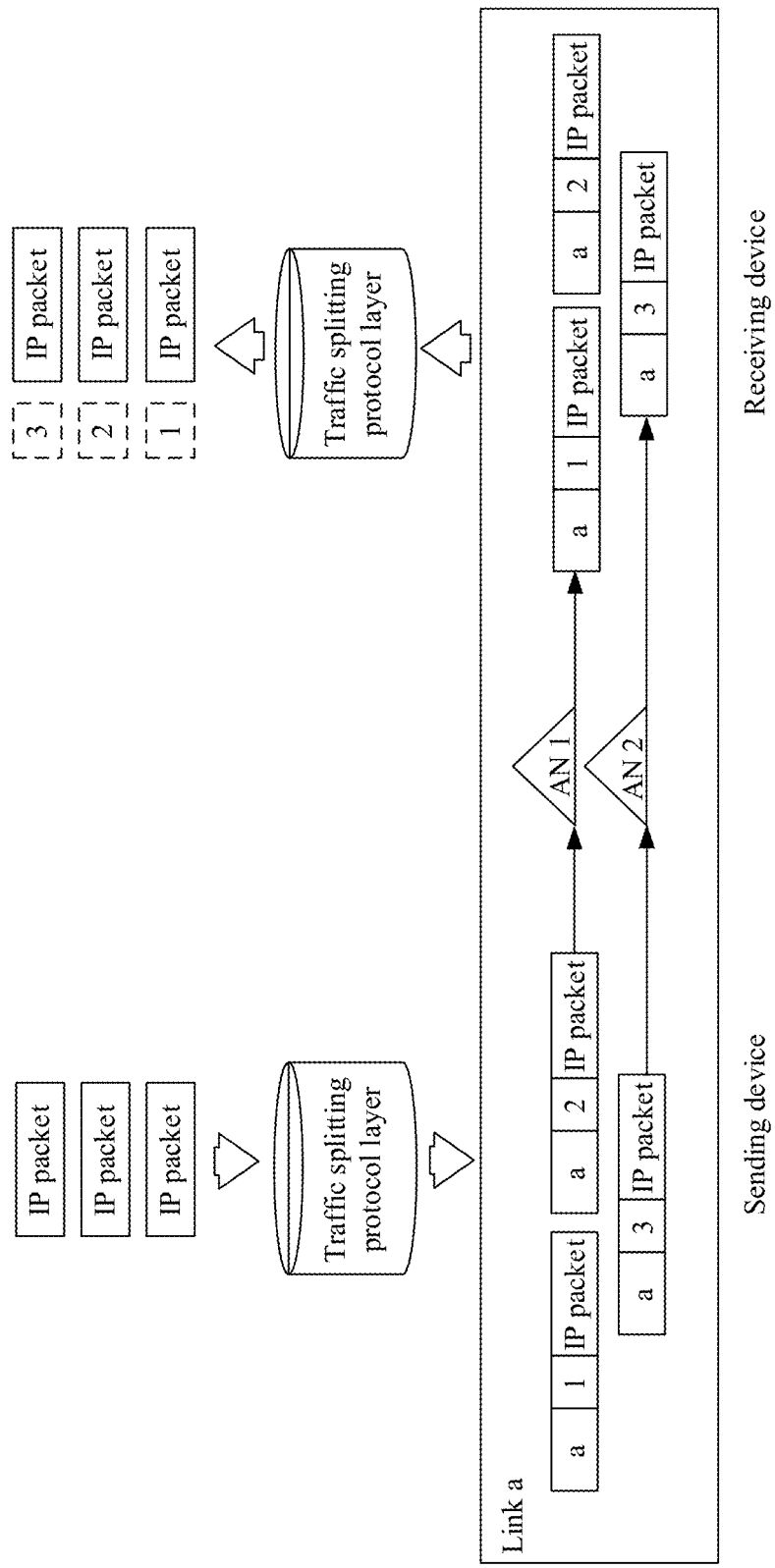
FIG. 10 shows an example 1 of a communication method according to an embodiment of this application.

FIG. 10 shows a simple example of a communication method according to an embodiment of this application. In this example, a description is provided by using an example in which the first access device is an AN 1 and the second access device is an AN 2. In addition, for brevity, only a link header and a data payload are shown, and an N3 header is not shown. It is assumed that there are three IP data packets (IP packets for short). After the IP packets are separately encapsulated at a traffic splitting protocol layer, link headers and a traffic splitting status of the packets are shown in FIG. 10. Sequence identifiers of the three IP packets are 1, 2, and 3. Identifiers of links each are a. The IP packet whose sequence identifier is 3 is sent to the receiving device by using the AN 2, while the IP packets whose sequence identifiers are 2 and 1 are sent to the receiving device by using the AN 1. It is assumed that an order in which the IP packets arrive at the receiving device is: the IP packet whose sequence identifier is 3, the IP packet whose sequence identifier is 2, and the IP packet whose sequence identifier is 1. After receiving the IP packets, the receiving device may parse the IP packets at a traffic splitting protocol layer, and determine that sequence identifiers of the IP packets that arrive successively are 3, 2, and 1 and the identifiers of the links each are a. Then, the receiving device reorders the IP packets. After the reordering, the IP packet whose sequence identifier is 1, the IP packet whose sequence identifier is 2, and the IP packet whose sequence identifier is 3 may be sequentially sent to a target device, or other processing may be performed on the IP packets. This is not specifically limited in this embodiment of this application.

Figure 11:
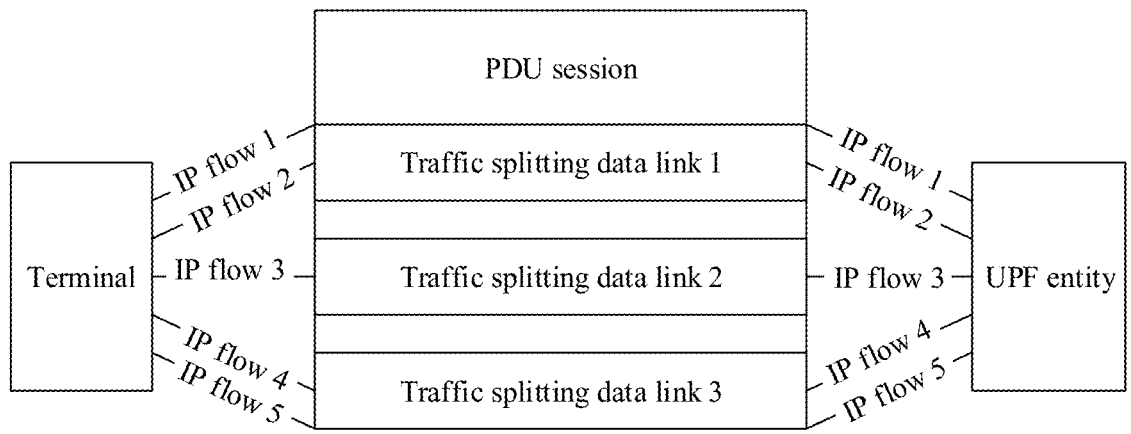
FIG. 11 is a schematic diagram 1 of use of a link according to an embodiment of this application.
Figure 12:
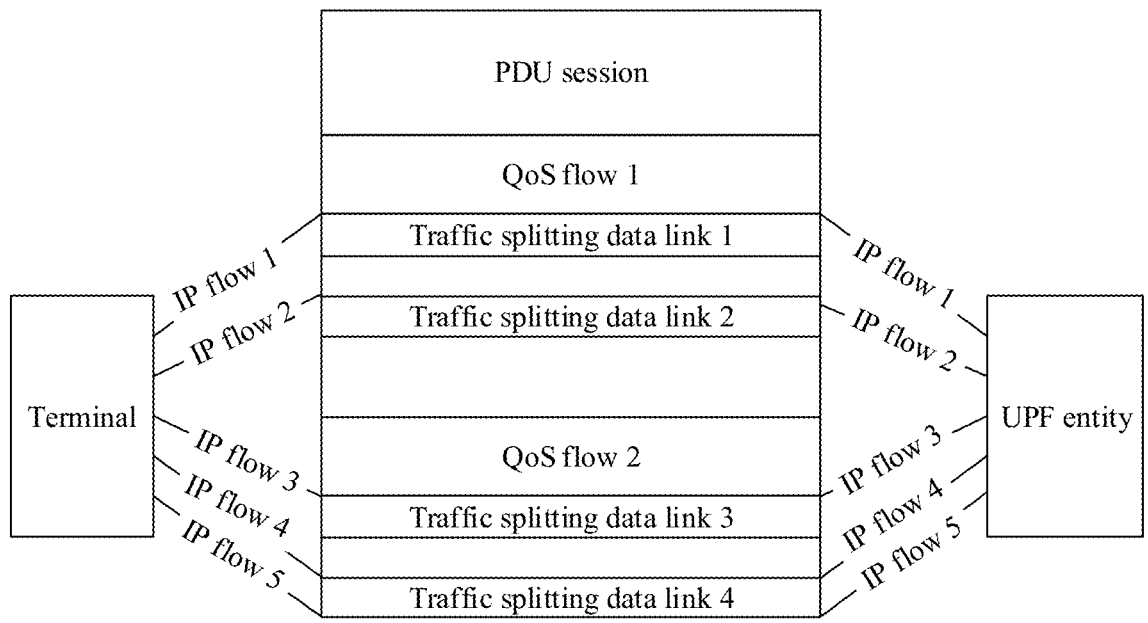
FIG. 12 is a schematic diagram 2 of use of a link according to an embodiment of this application.

For a case in which a plurality of IP flows correspond to different links, use of the links may be shown in FIG. 11 or FIG. 12.

Use of the links shown in FIG. 11 corresponds to the case in which one PDU session may correspond to one or more traffic splitting data links and that is shown in FIG. 3a to FIG. 3d. For example, as shown in FIG. 11, one PDU session may correspond to three traffic splitting data links: a traffic splitting data link 1, a traffic splitting data link 2, and a traffic splitting data link 3. An IP flow 1 and an IP flow 2 are transmitted over the traffic splitting data link 1; an IP flow 3 is transmitted over the traffic splitting data link 2; an IP flow 4 and an IP flow 5 are transmitted over the traffic splitting data link 3.

Use of the links shown in FIG. 12 corresponds to the case shown in FIG. 4 in which one PDU session includes one or more QoS flows and one QoS flow may correspond to one or more traffic splitting data links. For example, as shown in FIG. 12, one PDU session includes two QoS flows: a QoS flow 1 and a QoS flow 2. The QoS flow 1 may correspond to two traffic splitting data links: a traffic splitting data link 1 and a traffic splitting data link 2; the QoS flow 2 may correspond to two traffic splitting data links: a traffic splitting data link 3 and a traffic splitting data link 4. An IP flow 1 is transmitted over the traffic splitting data link 1; an IP flow 2 is transmitted over the traffic splitting data link 2; an IP flow 3 is transmitted over the traffic splitting data link 3; an IP flow 4 and an IP flow 5 are transmitted over the traffic splitting data link 4.

Based on the communication method provided in this embodiment of this application, an out-of-order problem caused by per-packet traffic splitting can be resolved. Further, packet loss at a TCP layer above an IP layer can be reduced, and frame skipping and frame freezing due to out-of-order do not occur when streaming media service data is transmitted at a UDP layer above the IP layer, so that user experience is improved.

Actions of the terminal and the UPF entity in operations S801 to S817 may be performed by the processor 701 in the communications device 700 shown in FIG. 7 by invoking application program code stored in the memory 703. This is not limited in this embodiment of this application.

Figure 13A:
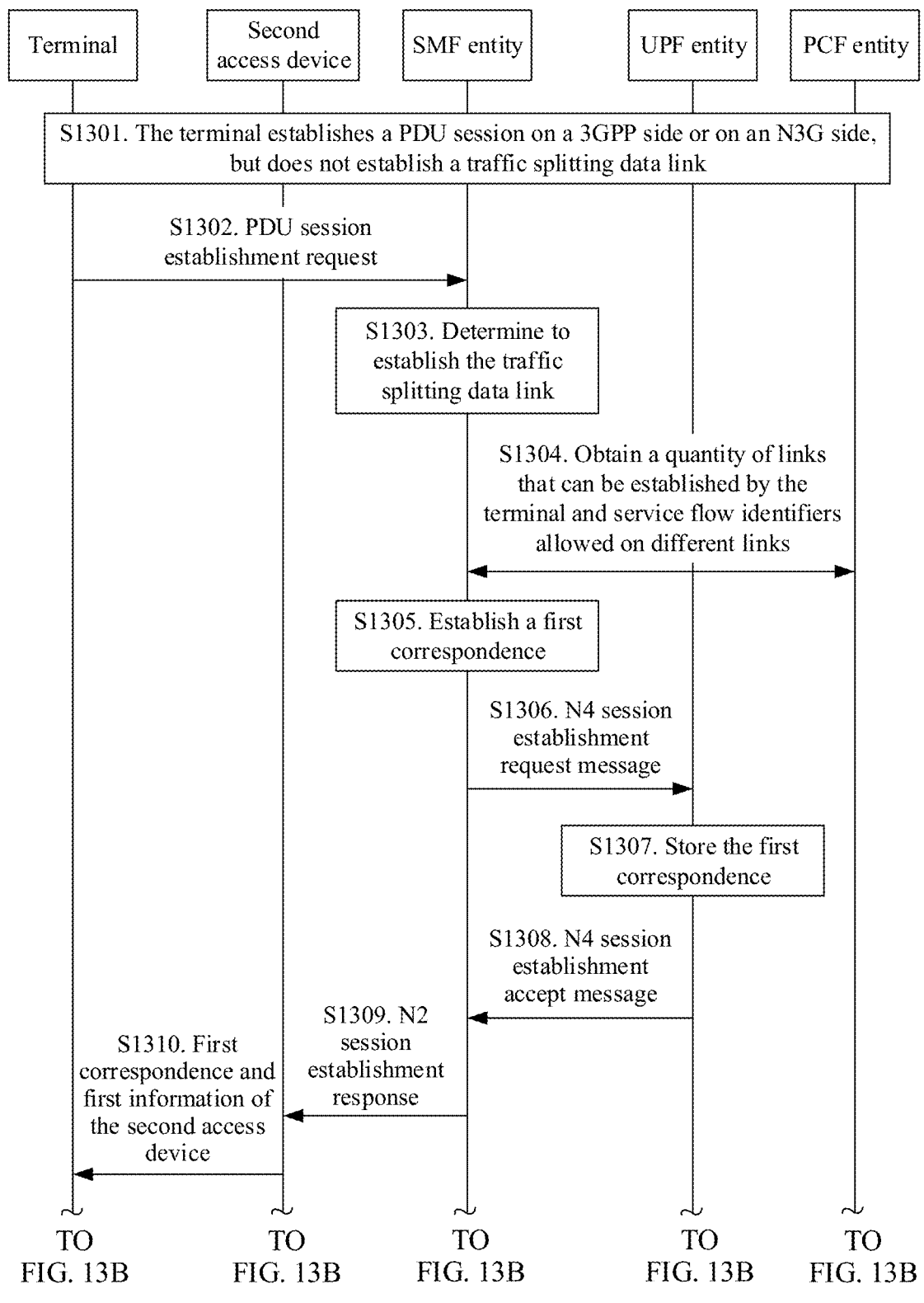
FIG. 13A and FIG. 13B are a schematic flowchart 2 of a communication method according to an embodiment of this application.
Figure 13B:
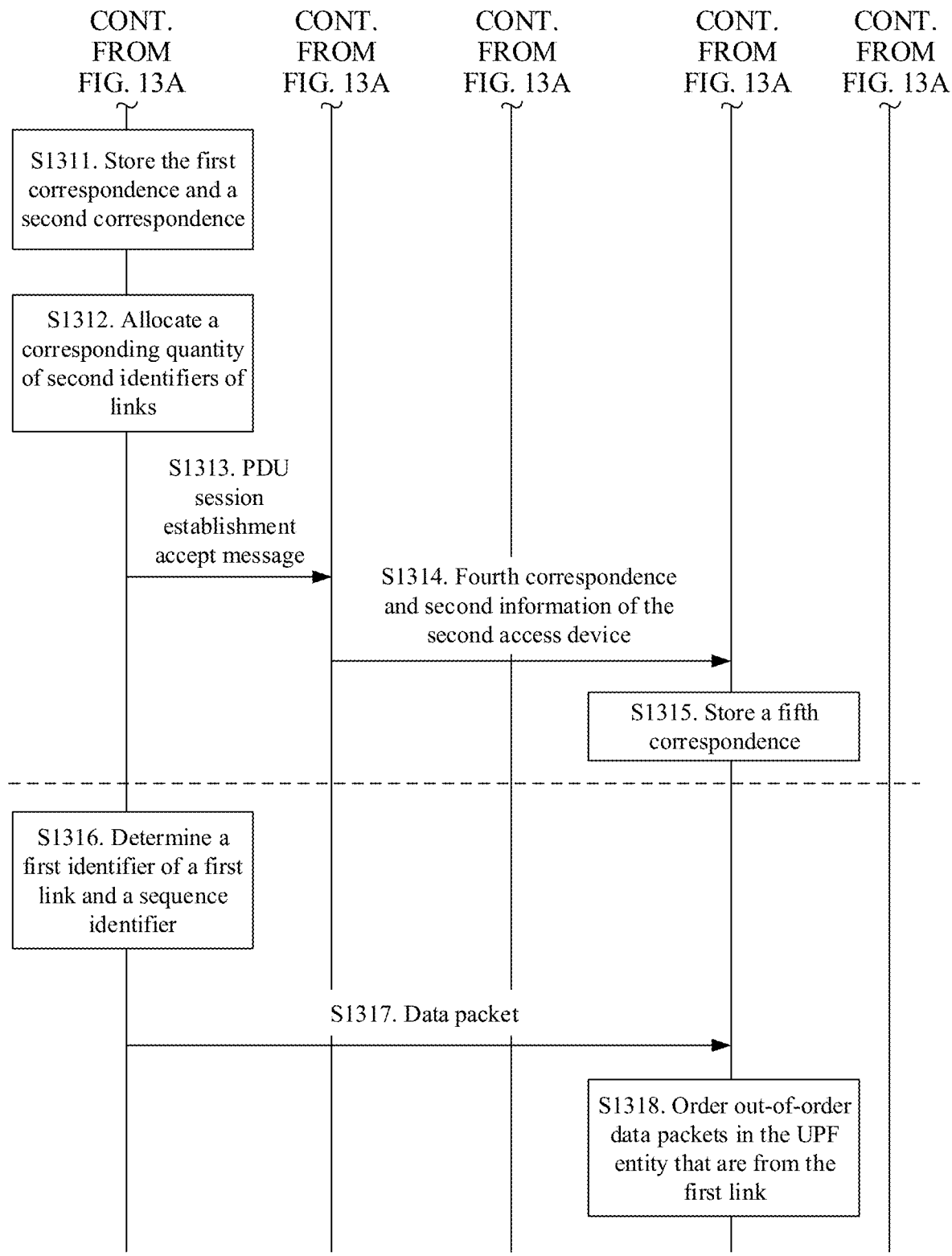

In the embodiment shown in FIG. 8A and FIG. 8B, an example in which one link corresponds to one identifier of the link is used for description. Optionally, one link may alternatively correspond to two identifiers of the link. For example, when uplink transmission is performed over the link, a first identifier corresponding to the link may be used; when downlink transmission is performed over the link, a second identifier corresponding to the link may be used. This is not specifically limited in this embodiment of this application. For example, the communications system shown in FIG. 5 is applied to the 5G network shown in FIG. 6. FIG. 13A and FIG. 13B show another communication method according to an embodiment of this application. The method includes the following operations.

S1301 to S1311. Similar to operations S801 to S811. An only difference lies in that the identifier of the link in operations S801 to S811 is replaced by a first identifier of a link in operations S1301 to S1311. For example, the identifier of the first link is replaced by a first identifier of a first link. For details, refer to the embodiment shown in FIG. 8A and FIG. 8B. Details are not described herein again.

S1312. A terminal allocates a corresponding quantity of second identifiers of links and establishes a fourth correspondence.

Optionally, the fourth correspondence in this embodiment of this application may be a correspondence between a first identifier of the link and a second identifier of the link, or may be a correspondence between a second identifier of the link and a service flow identifier. This is not specifically limited in this embodiment of this application.

S1313. The terminal sends a PDU session establishment accept message to a second access device, so that the second access device receives the PDU session establishment accept message from the terminal. The PDU session establishment accept message carries the fourth correspondence.

S1314. The second access device sends the fourth correspondence and second information of the second access device to a UPF entity, so that the UPF entity receives the fourth correspondence and the second information of the second access device from the terminal.

For a related description of the second information of the second access device, refer to the embodiment shown in FIG. 8A and FIG. 8B. Details are not described herein again.

S1315. The UPF entity stores a fifth correspondence, where the fifth correspondence is a correspondence between the second identifier of the link and the second information of the second access device.

In one embodiment, if the UPF entity stores a correspondence between the first identifier of the link and the service flow identifier in operation S1307, after the UPF entity receives the fourth correspondence and the second information of the second access device from the terminal, it is equivalent that a correspondence between the second identifier of the link, the service flow identifier, and the second information of the second access device is established.

In one embodiment, if the UPF entity stores a correspondence between a PDU session ID, the first identifier of the link, and the service flow identifier in operation S1307, after the UPF entity receives the fourth correspondence and the second information of the second access device from the terminal, it is equivalent that a correspondence between the PDU session ID, the second identifier of the link, the service flow identifier, and the second information of the second access device is established. Further, when the terminal establishes a PDU session on a 3GPP side or on an N3G side in operation S1301, the UPF entity may store a correspondence between the PDU session ID and second information of the first access device. Therefore, in this case, it is equivalent that a correspondence between the PDU session ID, the second identifier of the link, the service flow identifier, the second information of the first access device, and the second information of the second access device is established.

In one embodiment, if the UPF entity stores a correspondence between a PDU session ID, a QFI, the first identifier of the link, and the service flow identifier in operation S1307, after the UPF entity receives the fourth correspondence and the second information of the second access device from the terminal, it is equivalent that a correspondence between the PDU session ID, the QFI, the second identifier of the link, the service flow identifier, and the second information of the second access device is established. Further, when the terminal establishes a PDU session on a 3GPP side or on an N3G side in operation S1301, the UPF entity may store a correspondence between the PDU session ID and second information of the first access device. Therefore, in this case, it is equivalent that a correspondence between the PDU session ID, the QFI, the second identifier of the link, the service flow identifier, the second information of the first access device, and the second information of the second access device is established.

For a related description of the second information of the second access device, refer to the embodiment shown in FIG. 8A and FIG. 8B. Details are not described herein again.

The following further describes the communication method provided in this embodiment of this application by using an example in which a sending device is the terminal, and a receiving device is the UPF entity, that is, the terminal sends a data packet to the UPF entity. The communication method further includes the following operations.

S1316 to S1318. Similar to operations S815 to S817. An only difference lies in that the identifier of the first link in operations S815 to S817 is replaced by a first identifier of a first link in operations S1316 to S1318. For details, refer to the embodiment shown in FIG. 8A and FIG. 8B. Details are not described herein again.

Operations S1316 to S1318 are described by using the example in which the terminal sends a data packet to the UPF entity. Optionally, the UPF entity may also send a data packet to the terminal, and a solution is similar to the solution in which the terminal sends a data packet to the UPF entity, except that the sending device is changed from the terminal to the UPF entity, the receiving device is changed from the UPF entity to the terminal, and the first identifier of the first link is replaced by a second identifier of the first link. For details, refer to the embodiment shown in FIG. 8A and FIG. 8B. Details are not described herein again.

To be specific, in this embodiment of this application, in a case in which one link corresponds to two identifiers of the link, when the terminal sends a data packet to the UPF entity, an identifier of a link included in a header of the data packet is allocated on a network side; when the UPF entity sends a data packet to the terminal, an identifier of a link included in a header of the data packet is allocated by the terminal.

In one embodiment, in the case in which one link corresponds to two identifiers of the link, alternatively, the two identifiers of the link may be both allocated on the network side. For example, after an SMF entity allocates, based on a quantity of links that can be established by the terminal and service flow identifiers allowed on different links, a corresponding quantity of first identifiers of the links and a corresponding quantity of second identifiers of the links, and establishes a correspondence between the first identifier of the link and the service flow identifier and a correspondence between the second identifier of the link and the service flow identifier, the SMF entity sends the correspondence between the first identifier of the link and the service flow identifier to the terminal and sends the correspondence between the second identifier of the link and the service flow identifier to the UPF entity. In this case, when sending a data packet, the terminal may add a first identifier of a link to a header of the data packet; when sending a data packet, the UPF entity may add a second identifier of a link to a header of the data packet. This is not specifically limited in this embodiment of this application.

Based on the communication method provided in this embodiment of this application, an out-of-order problem caused by per-packet traffic splitting can be resolved. Further, packet loss at a TCP layer above an IP layer can be reduced, and frame skipping and frame freezing due to out-of-order do not occur when streaming media service data is transmitted at a UDP layer above the IP layer, so that user experience is improved.

Actions of the terminal and the UPF entity in operations S1301 to S1318 may be performed by the processor 701 in the communications device 700 shown in FIG. 7 by invoking application program code stored in the memory 703. This is not limited in this embodiment of this application.

Figure 14A:
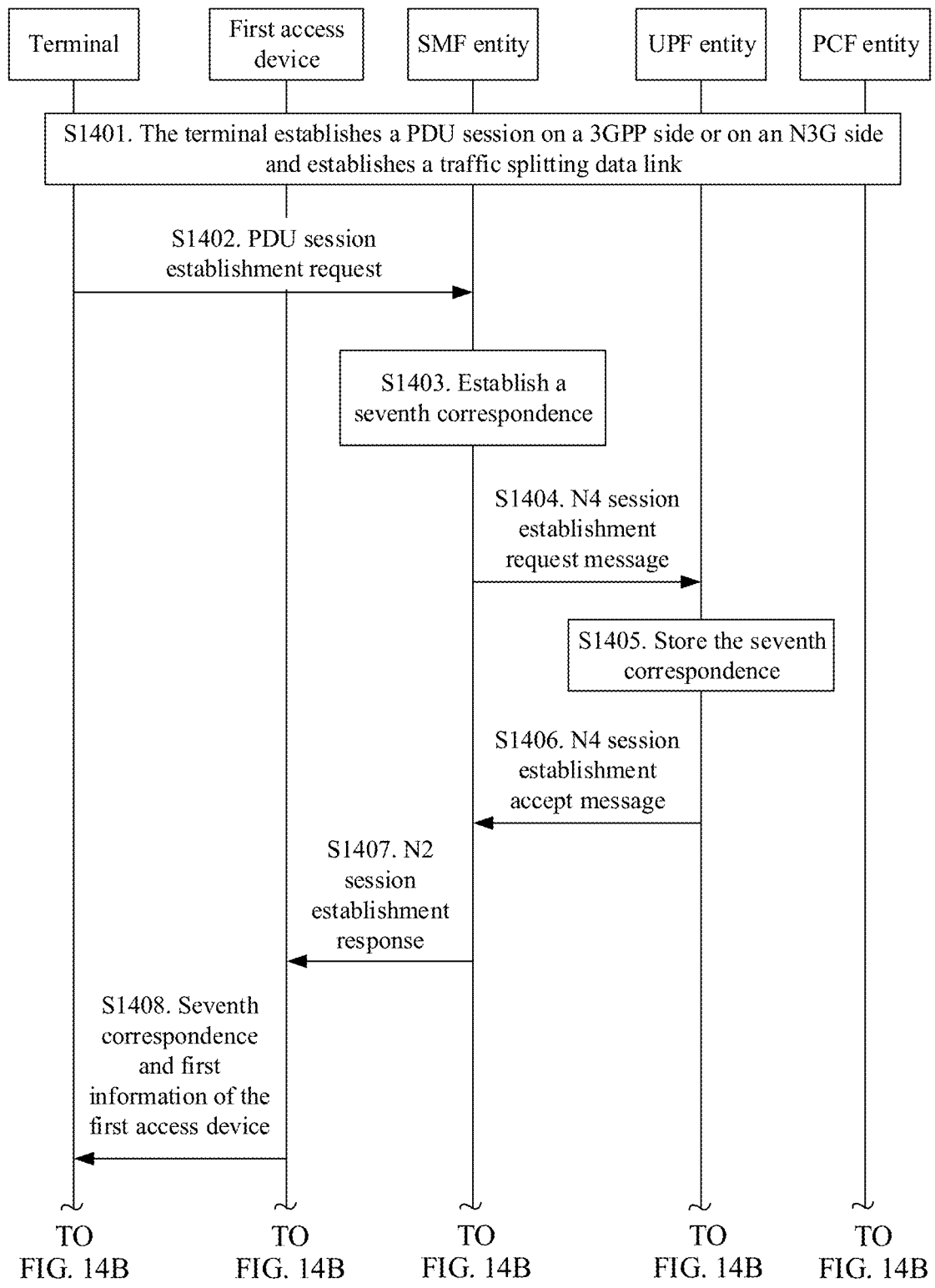
FIG. 14A and FIG. 14B are a schematic flowchart 3 of a communication method according to an embodiment of this application.
Figure 14B:
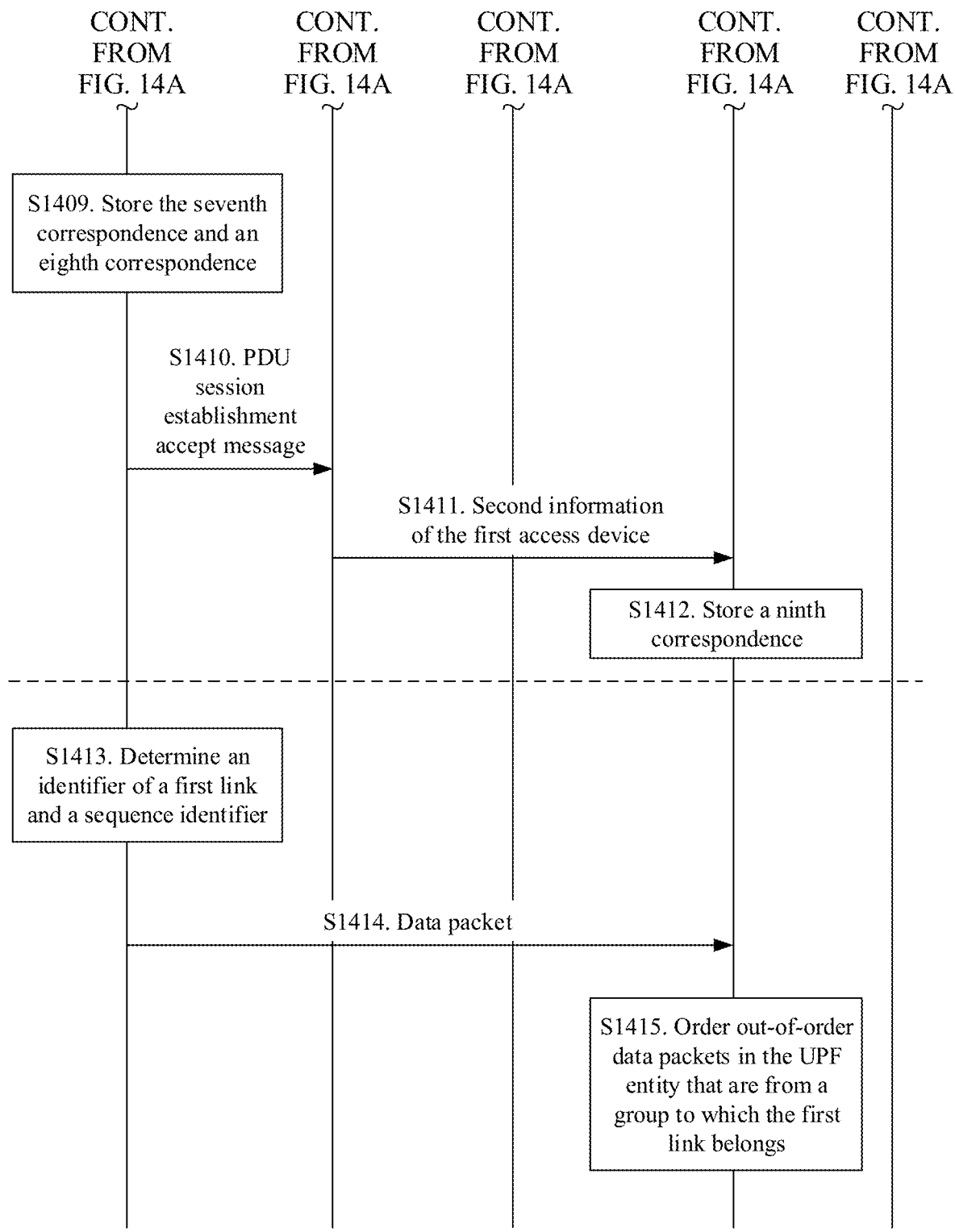

The embodiments shown in FIG. 8A and FIG. 8B, and FIG. 13A and FIG. 13B are described by using an example in which per-packet traffic splitting can be implemented by using a single link. Optionally, per-packet traffic splitting may be implemented by using a link group. This is not specifically limited in this embodiment of this application. For example, the communications system shown in FIG. 5 is applied to the 5G network shown in FIG. 6. FIG. 14A and FIG. 14B show still another communication method according to an embodiment of this application. The method includes the following operations.

S1401. A terminal establishes a PDU session on a 3GPP side or on an N3G side and establishes a traffic splitting data link.

For specific implementation of operation S1401, refer to operations S802 to S814. An only difference lies in that in the embodiment shown in FIG. 8A and FIG. 8B, one link corresponds to two access devices: the first access device and the second access device. For example, before operation S802 is performed, the terminal already establishes a PDU session on the other side. Therefore, in operation S811, if the first correspondence is shown in Table 2, it is equivalent that the terminal establishes the correspondence between the PDU session ID, the identifier of the link, the service flow identifier, the first information of the first access device, and the first information of the second access device; or if the first correspondence is shown in Table 3, it is equivalent that the terminal establishes the correspondence between the PDU session ID, the QFI, the identifier of the link, the service flow identifier, the first information of the first access device, and the first information of the second access device. In operation S814, if the first correspondence stored in operation S807 is shown in Table 2, it is equivalent that the UPF entity establishes the correspondence between the PDU session ID, the identifier of the link, the service flow identifier, the second information of the first access device, and the second information of the second access device; or if the first correspondence stored in operation S807 is shown in Table 3, it is equivalent that the UPF entity establishes the correspondence between the PDU session ID, the QFI, the identifier of the link, the service flow identifier, the second information of the first access device, and the second information of the second access device. However, in this embodiment of this application, one link corresponds to one access device. For example, if a first correspondence is shown in Table 3, the terminal is to establish a correspondence between a PDU session ID, an identifier of a link, a service flow identifier, and first information of the second access device, and the UPF entity is to establish a correspondence between a PDU session ID, an identifier of a link, a service flow identifier, and second information of the second access device; or if a first correspondence is shown in Table 3, the terminal is to establish a correspondence between a PDU session ID, a QFI, an identifier of a link, a service flow identifier, and second information of the second access device, and the UPF entity is to establish a correspondence between a PDU session ID, a QFI, an identifier of a link, a service flow identifier, and second information of the second access device.

Assuming that the traffic splitting data link established by the terminal in operation S1401 includes a first link, the communication method provided in this embodiment of this application further includes the following operations.

S1402. The terminal initiates a PDU session establishment procedure, and sends a PDU session establishment request to an SMF entity, so that the SMF entity receives the PDU session establishment request from the terminal. The PDU session establishment request carries a sixth correspondence.

For a related description of the sixth correspondence, refer to the related description of the first correspondence. An only difference lies in that the link in the first correspondence is replaced by the first link in the sixth correspondence. Details are not described herein again.

If the PDU session is established on the 3GPP side in operation S1401, a PDU session is established on the N3G side in operation S1402, and in this case, a corresponding first access device may be the N3G-GW in FIG. 6. If the PDU session is established on the N3G side in operation S1401, a PDU session is established on the 3GPP side in operation S1402, and in this case, a corresponding first access device may be the RAN device in FIG. 6. A general description is provided herein, and details are not described below again.

S1403. The SMF entity allocates an identifier that is of a second link and that corresponds to an identifier of the first link, and establishes a seventh correspondence, where the seventh correspondence is a correspondence between the identifier of the first link and the identifier of the second link.

S1404. The SMF entity sends an N4 session establishment request message to the UPF entity, so that the UPF entity receives the N4 session establishment request message from the SMF entity. The N4 session establishment request message carries the seventh correspondence.

S1405. The UPF entity stores the seventh correspondence.

In one embodiment, in the case shown in FIG. 3a to FIG. 3d, when the traffic splitting data link is established in operation S1401, the UPF entity already stores a correspondence between the PDU session ID, the service flow identifier, and the identifier of the first link. Therefore, in this case, it is equivalent that a correspondence between the PDU session ID, the service flow identifier, and the identifier of the second link is established. Alternatively, in the case shown in FIG. 4, when the traffic splitting data link is established in operation S1401, the UPF entity already stores a correspondence between the PDU session ID, the QFI, the service flow identifier, and the identifier of the first link. Therefore, in this case, it is equivalent that a correspondence between the PDU session ID, the QFI, the service flow identifier, and the identifier of the second link is established. This is not specifically limited in this embodiment of this application.

S1406. Same as operation S808. For details, refer to the embodiment shown in FIG. 8A and FIG. 8B. Details are not described herein again.

S1407. The SMF entity sends an N2 session establishment response to the first access device, so that the first access device receives the N2 session establishment response from the SMF entity. The N2 session establishment response carries uplink path information and the seventh correspondence.

For a related description of the uplink path information, refer to the embodiment shown in FIG. 8A and FIG. 8B. Details are not described herein again.

S1408. After an air interface connection is configured between the first access device and the terminal, the first access device sends the seventh correspondence and first information of the first access device to the terminal, so that the terminal receives the seventh correspondence and the first information of the first access device from the access device.

For a related description of the first information of the first access device, refer to the embodiment shown in FIG. 8A and FIG. 8B. Details are not described herein again.

S1409. The terminal stores an eighth correspondence and the received seventh correspondence, where the eighth correspondence is a correspondence between the identifier of the second link and the first information of the first access device.

To be specific, in this case, it is equivalent that a correspondence between the identifier of the second link, the service flow identifier, and the first information of the first access device is established. Alternatively, in the case shown in FIG. 3a to FIG. 3d, it is equivalent that a correspondence between the PDU session ID, the identifier of the second link, the service flow identifier, and the first information of the first access device is established. Alternatively, in the case shown in FIG. 4, it is equivalent that a correspondence between the PDU session ID, the QFI, the identifier of the second link, the service flow identifier, and the first information of the first access device is established.

S1410. The terminal sends a PDU session establishment accept message to the first access device, so that the first access device receives the PDU session establishment accept message from the terminal.

S1411. The first access device sends second information of the first access device to the UPF entity, so that the UPF entity receives the second information of the first access device from the terminal.

For a related description of the second information of the first access device, refer to the embodiment shown in FIG. 8A and FIG. 8B. Details are not described herein again.

S1412. The UPF entity stores a ninth correspondence, where the ninth correspondence is a correspondence between the identifier of the second link and the second information of the first access device.

In one embodiment, in the case shown in FIG. 3a to FIG. 3d, the correspondence between the PDU session ID, the service flow identifier, and the identifier of the second link in operation S1405 is already established in the UPF entity. Therefore, in this case, it is equivalent that a correspondence between the PDU session ID, the service flow identifier, the identifier of the second link, and the second information of the first access device is established. Alternatively, in the case shown in FIG. 4, the correspondence between the PDU session ID, the QFI, the service flow identifier, and the identifier of the second link in operation S1405 is already established in the UPF entity. Therefore, in this case, it is equivalent that a correspondence between the PDU session ID, the QFI, the service flow identifier, the identifier of the second link, and the second information of the first access device is established. This is not specifically limited in this embodiment of this application.

To be specific, in this case, the first link and the second link may form a link group, and each link in the link group corresponds to one access device. A sending device may select one link from the link group, to send a data packet.

In one embodiment, if the traffic splitting data link established by the terminal in operation S1401 further includes another link, for example, a third link, the SMF entity further allocates an identifier that is of a fourth link and that corresponds to an identifier of the third link, and constructs a link group of the third link and the fourth link with reference to the foregoing method. Details are not described in this embodiment of this application.

The following further describes the communication method provided in this embodiment of this application by using an example in which a sending device is the terminal, and a receiving device is the UPF entity, that is, the terminal sends a data packet to the UPF entity. The communication method further includes the following operations.

S1413. The terminal determines a sequence identifier of a to-be-transmitted data packet and the identifier of the first link for transmitting the data packet.

In this embodiment of this application, one link group shares one sending sequence. For example, in this embodiment of this application, data packets to be transmitted over the first link and the second link may be numbered according to a sending order. For example, the data packets to be transmitted over the first link are numbered 1, 3, 5, 7, and so on; the data packets to be transmitted over the second link are numbered 1, 3, 5, 7, and so on.

Optionally, in one embodiment of this application, the terminal may determine, based on a correspondence between a service flow identifier and identifiers of a plurality of links in a link group, the identifier of the first link for transmitting the data packet. For example, assuming that the link group includes the first link and the second link, the terminal may determine, based on a correspondence between the service flow identifier and the identifier of the first link and a correspondence between the service flow identifier and the identifier of the second link, that the data packet may be transmitted over the first link or the second link, and further, the terminal may determine, based on a factor such as link quality, the identifier of the first link for transmitting the data packet.

In one embodiment, if the service flow identifier includes a 5-tuple, that the terminal determines, based on the correspondence between the service flow identifier and the identifiers of the plurality of links in the link group, the identifier of the first link for transmitting the data packet includes: determining, by the terminal based on a 5-tuple of the data packet and a correspondence between the 5-tuple and the identifiers of the plurality of links in the link group, the identifier of the first link for transmitting the data packet.

Alternatively, in a possible embodiment, if the service flow identifier includes a QFI or a service flow identifier at a session granularity, that the terminal determines, based on the correspondence between the service flow identifier and the identifiers of the plurality of links in the link group, the identifier of the first link for transmitting the data packet includes: determining, by the terminal, the service flow identifier based on a 5-tuple of the data packet; and determining, by the terminal based on the service flow identifier and the correspondence between the service flow identifier and the identifiers of the plurality of links in the link group, the identifier of the first link for transmitting the data packet.

S1414 to S1415. Similar to operations S815 to S817. An only difference lies in that the first link in operations S815 to S817 is replaced by the link group to which the first link belongs in operations S1414 to S1415. For details, refer to the embodiment shown in FIG. 8A and FIG. 8B. Details are not described herein again.

Operations S1413 to S1415 are described by using the example in which the terminal sends a data packet to the UPF entity. Optionally, the UPF entity may also send a data packet to the terminal, and a solution is similar to the solution in which the terminal sends a data packet to the UPF entity, except that the sending device is changed from the terminal to the UPF entity and the receiving device is changed from the UPF entity to the terminal. Details are not described herein again.

Figure 15:
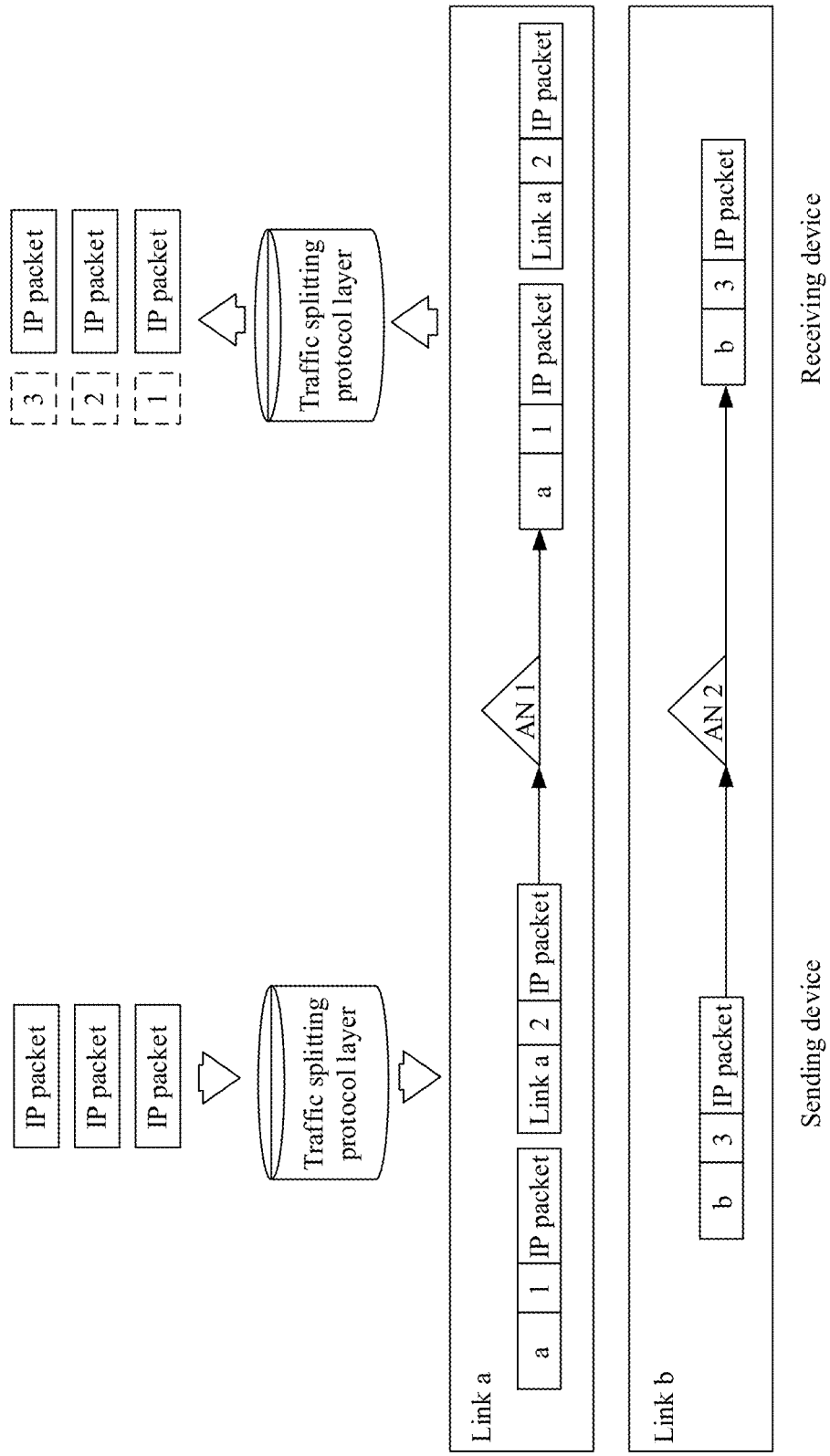
FIG. 15 shows an example 2 of a communication method according to an embodiment of this application.

FIG. 15 shows a simple example of a communication method according to an embodiment of this application. In this example, a description is provided by using an example in which the first access device is an AN 1 and the second access device is an AN 2. In addition, for brevity, only a link header and a data payload are shown, and an N3 header is not shown. It is assumed that a link a and a link b belong to a same link group, and there are three IP data packets (IP packets for short). After the IP packets are separately encapsulated at a traffic splitting protocol layer, link headers and a traffic splitting status of the packets are shown in FIG. 10. Sequence identifiers of the three IP packets are 1, 2, and 3. An identifier of a link for the IP packet whose sequence identifier is 1 and an identifier of a link for the IP packet whose sequence identifier is 2 are both a. The IP packets whose sequence identifiers are 1 and 2 are transmitted to the receiving device by using the AN 1. An identifier of a link for the IP packet whose sequence identifier is 3, is b. The IP packet whose sequence identifier is 3 is sent to the receiving device by using the AN 2. It is assumed that an order in which the IP packets arrive at the receiving device is: the IP packet whose sequence identifier is 3, the IP packet whose sequence identifier is 2, and the IP packet whose sequence identifier is 1. After receiving the IP packets, the receiving device may parse the IP packets at a traffic splitting protocol layer, and determine that sequence identifiers of the IP packets that arrive successively are 3, 2, and 1, the identifier of the link for the IP packet whose sequence identifier is 1 and the identifier of the link for the IP packet whose sequence identifier is 2 are both a, and the identifier of the link for the IP packet whose sequence identifier is 3, is b. Then, the receiving device reorders the IP packets. After the reordering, the IP packet whose sequence identifier is 1, the IP packet whose sequence identifier is 2, and the IP packet whose sequence identifier is 3 may be sequentially sent to a target device, or other processing may be performed on the IP packets. This is not specifically limited in this embodiment of this application.

Figure 16:
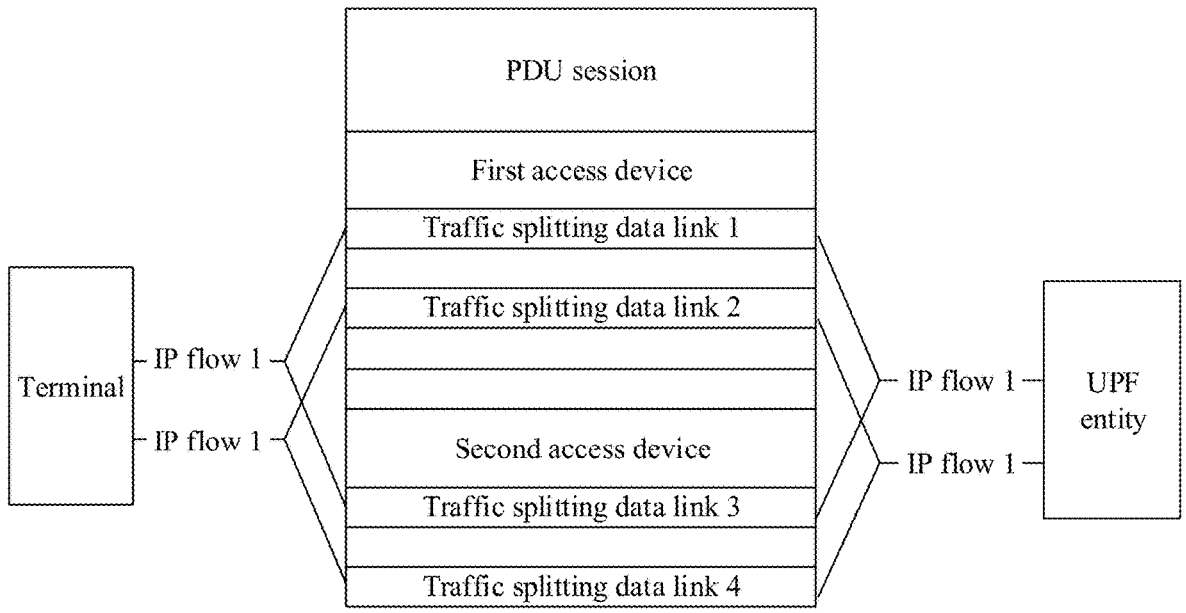
FIG. 16 is a schematic diagram 3 of use of a link according to an embodiment of this application.
Figure 17:
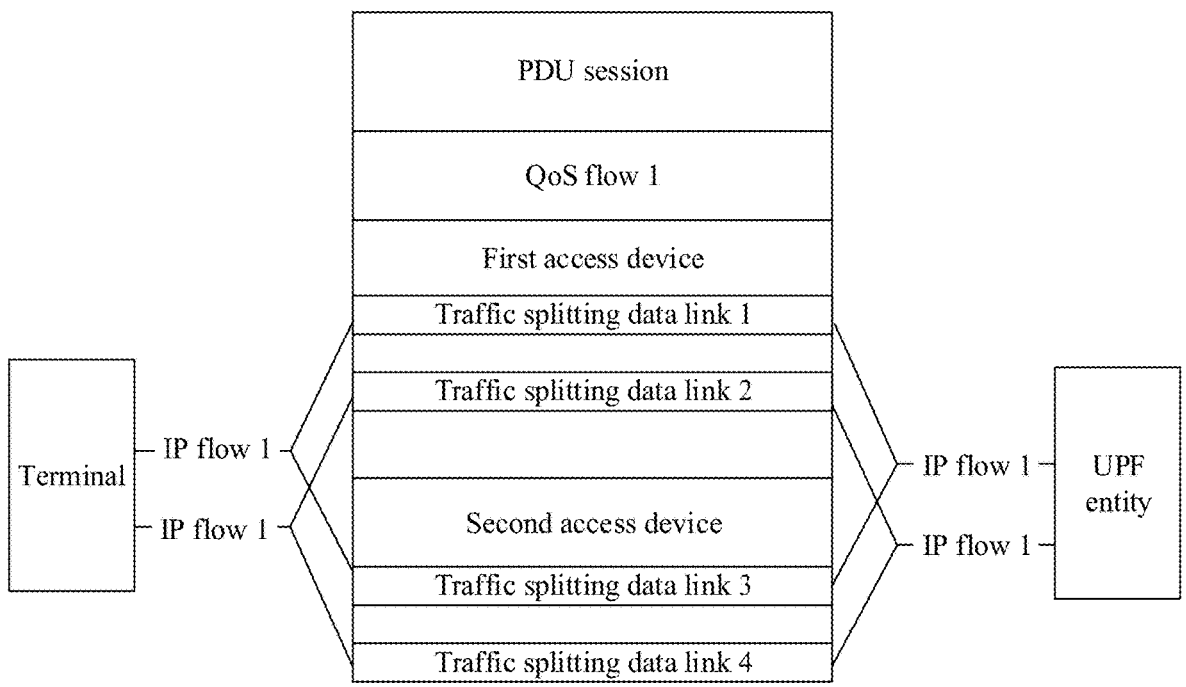
FIG. 17 is a schematic diagram 4 of use of a link according to an embodiment of this application.

For a case in which a plurality of IP flows correspond to different link groups, use of the link groups may be shown in FIG. 16 or FIG. 17.

Use of the link groups shown in FIG. 16 corresponds to the case in which one PDU session may correspond to one or more traffic splitting data links and that is shown in FIG. 3a to FIG. 3d. For example, as shown in FIG. 16, one PDU session may correspond to two traffic splitting data link groups. One traffic splitting data link group includes a traffic splitting data link 1 and a traffic splitting data link 3; the other traffic splitting data link group includes a traffic splitting data link 2 and a traffic splitting data link 4. An IP flow 1 may be transmitted over the traffic splitting data link 1 and the traffic splitting data link 3; an IP flow 2 may be transmitted over the traffic splitting data link 2 and the traffic splitting data link 4.

Use of the links shown in FIG. 17 corresponds to the case shown in FIG. 4 in which one PDU session includes one or more QoS flows and one QoS flow may correspond to one or more traffic splitting data links. For example, as shown in FIG. 12, one PDU session includes one QoS flow: a QoS flow 1. The QoS flow 1 may correspond to two traffic splitting data link groups. One traffic splitting data link group includes a traffic splitting data link 1 and a traffic splitting data link 3; the other traffic splitting data link group includes a traffic splitting data link 2 and a traffic splitting data link 4. An IP flow 1 may be transmitted over the traffic splitting data link 1 and the traffic splitting data link 3; an IP flow 2 may be transmitted over the traffic splitting data link 2 and the traffic splitting data link 4.

Based on the communication method provided in one embodiment of this application, an out-of-order problem caused by per-packet traffic splitting can be resolved. Further, packet loss at a TCP layer above an IP layer can be reduced, and frame skipping and frame freezing due to out-of-order do not occur when streaming media service data is transmitted at a UDP layer above the IP layer, so that user experience is improved.

Actions of the terminal and the UPF entity in operations S1401 to S1415 may be performed by the processor 701 in the communications device 700 shown in FIG. 7 by invoking application program code stored in the memory 703. This is not limited in this embodiment of this application.

Optionally, the embodiment shown in FIG. 14A and FIG. 14B is described by using an example in which one link corresponds to one identifier of the link. Optionally, one link may alternatively correspond to two identifiers of the link. For example, when the terminal sends a data packet to the UPF entity, an identifier of a link included in a header of the data packet is allocated on a network side; when the UPF entity sends a data packet to the terminal, an identifier of a link included in a header of the data packet is allocated by the terminal, or the identifiers of the two links are both allocated on the network side; and so on. For related implementation, refer to the embodiment shown in FIG. 13A and FIG. 13B. Details are not described in this embodiment of this application.

The foregoing embodiments of this application are described by using an example in which a first access technology may be a 3GPP access technology and a second access technology may be an N3G access technology, or a first access technology may be an N3G access technology and a second access technology may be a 3GPP access technology. Certainly, the first access technology and the second access technology in the embodiments of this application may also be other technologies. For example, the first access technology may be a 3GPP access technology, and the second access technology may be another access technology. Alternatively, the first access technology may be an N3G access technology, and the second access technology may be another access technology. Alternatively, both the first access technology and the second access technology may be other technologies. This is not specifically limited in the embodiments of this application.

The solutions provided in the embodiments of this application are mainly described above from a perspective of interaction between network elements. It may be understood that, to implement the foregoing functions, the sending device includes a corresponding hardware structure and/or software module for implementing each function. A person of ordinary skill in the art should easily be aware that, in combination with the examples described in the embodiments disclosed in this specification, units and algorithm operations can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In one embodiment of this application, the sending device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, division into the modules is an example, and is merely logical function division. In actual implementation, another division manner may be used.

Figure 18:
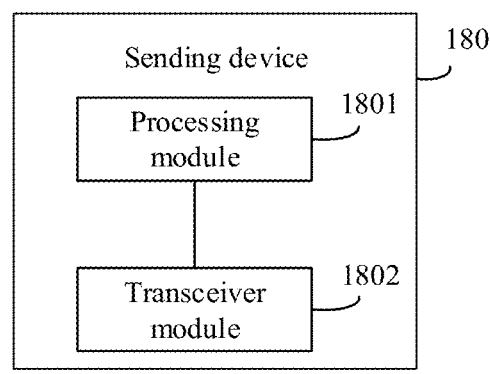
FIG. 18 is a schematic diagram of a structure of a sending device according to an embodiment of this application.

For example, when the functional modules are obtained through division in an integrated manner, FIG. 18 is a schematic diagram of a possible structure of a sending device 180 related to the foregoing embodiments. The sending device 180 includes a processing module 1801 and a transceiver module 1802. The processing module 1801 is configured to determine a sequence identifier of a to-be-transmitted data packet and an identifier of a first link for transmitting the data packet. The transceiver module 1802 is configured to send the data packet to a receiving device, where a header of the data packet includes the identifier of the first link and the sequence identifier, the identifier of the first link is used to identify the first link, and the sequence identifier is used to identify a sending order of the data packet over the first link or in a link group to which the first link belongs.

In one embodiment, the sequence identifier is used to identify the sending order of the data packet over the first link, and the processing module 1801 is specifically configured to determine, based on a correspondence between the identifier of the first link and a service flow identifier, the identifier of the first link for transmitting the data packet, where the service flow identifier is used to identify a service flow to which the data packet belongs.

In a possible embodiment, the service flow identifier includes a 5-tuple, and that the processing module 1801 is configured to determine, based on a correspondence between the identifier of the first link and a service flow identifier, the identifier of the first link for transmitting the data packet includes: determining, based on a 5-tuple of the data packet and a correspondence between the identifier of the first link and the 5-tuple, the identifier of the first link for transmitting the data packet.

In another possible embodiment, the service flow identifier includes a QFI or a service flow identifier at a session granularity, and that the processing module 1801 is configured to determine, based on a correspondence between the identifier of the first link and a service flow identifier, the identifier of the first link for transmitting the data packet includes: determining the service flow identifier based on a 5-tuple of the data packet; and determining, based on the service flow identifier and the correspondence between the identifier of the first link and the service flow identifier, the identifier of the first link for transmitting the data packet.

In one embodiment, the transceiver module 1802 is further configured to receive, from a session management entity, the correspondence between the identifier of the first link and the service flow identifier, where the identifier of the first link is allocated by the session management entity.

In one embodiment, the first link corresponds to a first access device and a second access device, the first access device is an access device corresponding to a first access technology, and the second access device is an access device corresponding to a second access technology. The processing module 1801 is further configured to establish a correspondence between the identifier of the first link, information of the first access device, and information of the second access device.

In one embodiment, the sequence identifier is used to identify the sending order of the data packet in the link group to which the first link belongs. The processing module 1801 is specifically configured to determine, based on a correspondence between a service flow identifier and identifiers of a plurality of links in the link group, the identifier of the first link for transmitting the data packet, where the service flow identifier is used to identify a service flow to which the data packet belongs.

In a possible embodiment, the service flow identifier includes a 5-tuple, and that the processing module 1801 is configured to determine, based on a correspondence between a service flow identifier and identifiers of a plurality of links in the link group, the identifier of the first link for transmitting the data packet includes: determining, by the sending device based on a 5-tuple of the data packet and a correspondence between the 5-tuple and the identifiers of the plurality of links in the link group, the identifier of the first link for transmitting the data packet.

In another possible embodiment, the service flow identifier includes a QFI or a service flow identifier at a session granularity, and that the processing module 1801 is configured to determine, based on a correspondence between a service flow identifier and identifiers of a plurality of links in the link group, the identifier of the first link for transmitting the data packet includes: determining the service flow identifier based on a 5-tuple of the data packet; and determining, based on the service flow identifier and the correspondence between the service flow identifier and the identifiers of the plurality of links in the link group, the identifier of the first link for transmitting the data packet.

In one embodiment, the sending device 180 is a terminal, and the link group includes the first link and a second link. The transceiver module 1802 is further configured to send the identifier of the first link to a session management entity during establishment of the second link, where the first link is an established link. The transceiver module 1802 is further configured to receive, from the session management entity, a correspondence between the identifier of the first link and an identifier of the second link, where the identifier of the first link is allocated by the session management entity. The processing module 1801 is further configured to establish a correspondence between the service flow identifier, the identifier of the first link, and the identifier of the second link.

In another possible embodiment, the sending device 180 is a user plane function entity, and the link group includes the first link and a second link. The transceiver module 1802 is further configured to receive, from a session management entity, a correspondence between the identifier of the first link and an identifier of the second link during establishment of the second link, where the identifier of the first link is allocated by a terminal or the identifier of the first link is allocated by the session management entity, and the first link is an established link. The processing module 1801 is further configured to establish a correspondence between the service flow identifier, the identifier of the first link, and the identifier of the second link.

In one embodiment, the first link corresponds to a first access device or a second access device, the first access device is an access device corresponding to a first access technology, and the second access device is an access device corresponding to a second access technology. The processing module 1801 is further configured to establish a correspondence between the identifier of the first link and information of the first access device, and a correspondence between the identifier of the second link and information of the second access device.

All related content of the operations in the foregoing method embodiments may be cited in function descriptions of corresponding functional modules. Details are not described herein.

In one embodiment, the sending device 180 is presented in a form of functional modules obtained through division in an integrated manner. The "module" herein may be an application-specific integrated circuit (application-specific integrated circuit, ASIC), a circuit, a processor and a memory that execute one or more software programs or firmware programs, an integrated logic circuit, and/or another component that can provide the foregoing function. In a simple embodiment, a person skilled in the art may figure out that the sending device 180 may be in the form shown in FIG. 7.

For example, the processor 701 in FIG. 7 may invoke the computer-executable instruction stored in the memory 703, to enable the sending device 180 to perform the communication method in the foregoing method embodiments.

In one embodiment, functions/implementation processes of the processing module 1801 and the transceiver module 1802 in FIG. 18 may be implemented by the processor 701 in FIG. 7 by invoking the computer-executable instruction stored in the memory 703. Alternatively, a function/implementation process of the processing module 1801 in FIG. 18 may be implemented by the processor 701 in FIG. 7 invoking the computer-executable instruction stored in the memory 703, and a function/implementation process of the transceiver module 1802 in FIG. 18 may be implemented by the communications interface 704 in FIG. 7.

The sending device provided in this embodiment of this application may be configured to perform the foregoing communication method. Therefore, for a technical effect that can be achieved by the sending device, refer to the foregoing method embodiments. Details are not described herein.

In the foregoing embodiment, the sending device 180 is presented in a form of functional modules obtained through division in an integrated manner. Certainly, each functional module of the sending device may be obtained through division based on each function in this embodiment of this application. This is not specifically limited in this embodiment of this application.

Optionally, an embodiment of this application provides a chip system. The chip system includes a processor, and the processor is configured to support a sending device in implementing the foregoing communication method, for example, determining a sequence identifier of a to-be-transmitted data packet and an identifier of a first link for transmitting the data packet. In a possible design, the chip system further includes a memory. The memory is configured to store a program instruction and data that are necessary for the sending device. The chip system may include a chip, or may include a chip and another discrete device. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or may be a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another operation, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the accompanying claims, and are intended to cover any of or all modifications, variations, combinations, or equivalents within the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
    determining, by a sending device based on a 5-tuple of a data packet of an IP flow, a service flow identifier;
    determining, by the sending device based on a correspondence between the service flow identifier and identifiers of a plurality of links in a link group, an identifier of a first link for transmitting the data packet of the IP flow, wherein the plurality of links in the link group is for transmitting a service flow;
    determining, by the sending device, a sequence identifier of the data packet in the IP flow, wherein the sequence identifier identifies a sending order of the data packet for the IP flow in a link group the first link belongs, and wherein the identifier of the first link identifies the first link;

sending, by the sending device, the data packet to a receiving device, wherein a header of the data packet comprises the identifier of the first link and the sequence identifier.

2. The method according to claim 1, wherein the service flow identifier is a quality of service flow identifier (QFI).

3. The method according to claim 1, wherein the sending device is a terminal, wherein the link group comprises the first link and a second link, and wherein the method further comprises:
sending, by the sending device, the identifier of the first link to a session management entity during establishment of the second link, wherein the first link is an established link;
receiving, by the sending device from the session management entity, a correspondence between the identifier of the first link and an identifier of the second link, wherein the identifier of the first link is allocated by the session management entity; and
establishing, by the sending device, a correspondence between the service flow identifier, the identifier of the first link, and the identifier of the second link.

4. The method according to claim 1, wherein the sending device is a user plane function entity, wherein the link group comprises the first link and a second link, and wherein the method further comprises:
receiving, by the sending device from a session management entity, a correspondence between the identifier of the first link and an identifier of the second link during establishment of the second link, wherein the identifier of the first link is allocated by a terminal or the identifier of the first link is allocated by the session management entity, and wherein the first link is an established link; and
establishing, by the sending device, a correspondence between the service flow identifier, the identifier of the first link, and the identifier of the second link.

5. The method according to claim 1, wherein the first link corresponds to a first access device or a second access device, wherein the first access device is corresponding to a first access technology, and the second access device is corresponding to a second access technology.

6. The method according to claim 5, further comprising:
establishing, by the sending device, a correspondence between the identifier of the first link and information of the first access device, and a correspondence between an identifier of a second link and information of the second access device.

7. The method according to claim 1, wherein links in the link group share one sending sequence.

8. A sending apparatus, comprising:
a processor coupled to a computer-readable storage medium, programming instructions causing the processor to be configured to:
determine, based on a 5-tuple of a data packet of an IP flow, a service flow identifier;
determine, based on a correspondence between the service flow identifier and identifiers of a plurality of links in a link group, an identifier of a first link for transmitting the data packet of the IP flow, wherein the plurality of links in the link group is for transmitting a service flow;
determine, a sequence identifier of the data packet in the IP flow, wherein the sequence identifier identifies a sending order of the data packet for the IP flow in a link group the first link belongs, and wherein the identifier of the first link identifies the first link; and
send the data packet to a receiving device, wherein a header of the data packet comprises the identifier of the first link and the sequence identifier.

9. The sending apparatus according to claim 8, wherein the service flow identifier is a quality of service flow identifier (QFI).

10. The sending apparatus according to claim 8, wherein a sending device is a terminal, wherein the link group comprises the first link and a second link, and wherein the processor is further configured to:
send the identifier of the first link to a session management entity during establishment of the second link, wherein the first link is an established link; and
receive, from the session management entity, a correspondence between the identifier of the first link and an identifier of the second link.

11. The sending apparatus according to claim 10, wherein the processor is further configured to:
establish a correspondence between the service flow identifier, the identifier of the first link, and the identifier of the second link.

12. The sending apparatus according to claim 8, wherein a sending device is a user plane function entity, wherein the link group comprises the first link and a second link, and wherein the processor is further configured to:
receive, from a session management entity, a correspondence between the identifier of the first link and an identifier of the second link during establishment of the second link, wherein the identifier of the first link is allocated by a terminal or the identifier of the first link is allocated by the session management entity, and wherein the first link is an established link.

13. The sending apparatus according to claim 12, wherein the processor is further configured to:
establish a correspondence between the service flow identifier, the identifier of the first link, and the identifier of the second link.

14. The sending apparatus according to claim 8, wherein the first link corresponds to a first access device or a second access device, wherein the first access device is corresponding to a first access technology, and wherein the second access device is corresponding to a second access technology.

15. The sending apparatus according to claim 14, wherein the processor is further configured to:
establish a correspondence between the identifier of the first link and information of the first access device, and a correspondence between an identifier of a second link and information of the second access device.

16. The sending apparatus according to claim 8, wherein links in the link group share one sending sequence.

17. The sending apparatus according to claim 8, wherein the sending apparatus is a sending device, or a chip system.

18. A system, comprising:
a receiving device, and
a sending device, comprising:
a processor configured to:
determine, based on a 5-tuple of a data packet of an IP flow, a service flow identifier;
determine, based on a correspondence between the service flow identifier and identifiers of a plurality of links in a link group, an identifier of a first link for transmitting the data packet of the IP flow, wherein the plurality of links in the link group is for transmitting a service flow;
determine, a sequence identifier of the data packet in the IP flow, wherein the sequence identifier identifies a sending order of the data packet for the IP flow in a link group the first link belongs, and wherein the identifier of the first link identifies the first link; and send the data packet to the receiving device, wherein a header of the data packet comprises the identifier of the first link and the sequence identifier.

19. The system according to claim 18, wherein the service flow identifier is a quality of service flow identifier (QFI).

20. The system according to claim 18, wherein the first link corresponds to a first access device or a second access device, wherein the first access device is corresponding to a first access technology, and wherein the second access device is corresponding to a second access technology.

21. A communication method, comprising:

determining, by a sending device based on a 5-tuple of a data packet of an IP flow, a service flow identifier;

determining, by the sending device based on a correspondence between the service flow identifier and identifiers of a plurality of links in a link group, an identifier of a first link for transmitting the data packet of the IP flow, wherein the plurality of links in the link group is for transmitting a service flow;

determining, by the sending device, a sequence identifier of the data packet of the IP flow, wherein the sequence identifier identifies a sending order of the data packet of the IP flow in a link group the first link belongs, and wherein the identifier of the first link identifies the first link;

sending, by the sending device, the data packet to a receiving device, wherein a header of the data packet comprises the identifier of the first link and the sequence identifier; and receiving, by the receiving device, the data packet from the sending device.

* * * * *